United States Patent
Pytlik et al.

(10) Patent No.: US 11,735,760 B2
(45) Date of Patent: *Aug. 22, 2023

(54) BUTTON CELLS AND METHOD OF PRODUCING SAME

(71) Applicant: VARTA Microbattery GmbH, Ellwangen (DE)

(72) Inventors: Eduard Pytlik, Ellwangen (DE); Jürgen Lindner, Ellwangen (DE); Ulrich Barenthin, Ellwangen (DE); Winfried Gaugler, Ellwangen (DE)

(73) Assignee: VARTA MICROBATTERY GMBH, Ellwangen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/792,420

(22) Filed: Feb. 17, 2020

(65) Prior Publication Data
US 2020/0185755 A1 Jun. 11, 2020

Related U.S. Application Data

(60) Division of application No. 15/696,354, filed on Sep. 6, 2017, now Pat. No. 11,233,264, which is a division
(Continued)

(30) Foreign Application Priority Data

Feb. 9, 2009 (DE) .................... 10 2009 008 859.8
Jun. 18, 2009 (DE) .................... 10 2009 030 359.6
Dec. 22, 2009 (DE) .................... 10 2009 060 788.9

(51) Int. Cl.
*H01M 6/12* (2006.01)
*H01M 6/46* (2006.01)
(Continued)

(52) U.S. Cl.
CPC ........ *H01M 10/0431* (2013.01); *H01M 6/10* (2013.01); *H01M 10/0427* (2013.01);
(Continued)

(58) Field of Classification Search
None
See application file for complete search history.

(56) References Cited

U.S. PATENT DOCUMENTS 3,069,489 A * 12/1962 Carmichael ............. H01M 2/02
429/174
3,748,182 A 7/1973 Brown
(Continued)

FOREIGN PATENT DOCUMENTS

CN 1184338 A 6/1998
CN 1224934 A 8/1999
(Continued)

OTHER PUBLICATIONS

Zhang, Guoshun et al. "Application of Auto Laser Welding in Rechargeable Battery Manufacturing," Chinese Journal of Lasers, vol. 35, No. 11, Nov. 2008.
(Continued)

*Primary Examiner* — Anca Eoff
(74) *Attorney, Agent, or Firm* — Leydig, Voit & Mayer, Ltd.

(57) ABSTRACT

A method for producing a button cell includes providing a cell cup, a cell top and an electrode-separator assembly winding, the electrode-separator assembly winding having a positive electrode and a negative electrode. An electrically insulating seal is applied at least to an outer portion of the cell top casing. The electrode-separator assembly winding is inserted into the cell top. The cell top is inserted into the cell cup to form a housing. A pressure is applied in a radial
(Continued)

direction perpendicular to an axis of the electrode-separator assembly winding so as to seal the housing.

30 Claims, 4 Drawing Sheets

Related U.S. Application Data of application No. 15/283,568, filed on Oct. 3, 2016, now Pat. No. 9,799,913, which is a continuation of application No. 14/827,387, filed on Aug. 17, 2015, now Pat. No. 9,496,581, which is a division of application No. 13/146,669, filed as application No. PCT/EP2010/000787 on Feb. 9, 2010, now Pat. No. 9,153,835.

(51) Int. Cl.

| *H01M 4/00* | (2006.01) |
| *H01M 6/10* | (2006.01) |
| *H01M 6/08* | (2006.01) |
| *H01M 10/04* | (2006.01) |
| *H01M 10/05* | (2010.01) |
| *H01M 10/0525* | (2010.01) |
| *H01M 10/24* | (2006.01) |
| *H01M 10/34* | (2006.01) |
| *H01M 50/109* | (2021.01) |
| *H01M 50/124* | (2021.01) |

(52) U.S. Cl.
CPC ....... *H01M 10/05* (2013.01); *H01M 10/0525* (2013.01); *H01M 10/24* (2013.01); *H01M 10/34* (2013.01); *H01M 10/345* (2013.01); *H01M 50/109* (2021.01); *H01M 50/124* (2021.01); *Y02E 60/10* (2013.01); *Y02P 70/50* (2015.11); *Y10T 29/4911* (2015.01); *Y10T 29/49108* (2015.01)

(56) References Cited

U.S. PATENT DOCUMENTS

| 3,827,916 A | 8/1974 | Fagan, Jr. |
| 3,960,599 A | 6/1976 | Reynier et al. |
| 4,020,242 A | 4/1977 | Okazaki et al. |
| 4,053,687 A * | 10/1977 | Coibion .............. H01M 2/1229 429/94 |
| 4,091,181 A | 5/1978 | Merritt, Jr. |
| 4,220,695 A | 9/1980 | Ishida et al. |
| 4,224,387 A | 9/1980 | Nakayama |
| 4,262,064 A | 4/1981 | Nagle |
| 4,321,316 A | 3/1982 | Kuehl |
| 4,487,819 A | 12/1984 | Koga |
| 4,520,085 A | 5/1985 | Wyser |
| 4,539,271 A | 9/1985 | Crabtree |
| 4,554,226 A | 11/1985 | Simonton |
| 4,664,989 A | 5/1987 | Johnson |
| 4,879,190 A | 11/1989 | Lundsgaard |
| 4,927,719 A | 5/1990 | Ashihara et al. |
| 5,128,219 A | 7/1992 | Kohler et al. |
| 5,273,842 A | 12/1993 | Yamahira et al. |
| 5,356,736 A | 10/1994 | Kita et al. |
| 5,378,560 A | 1/1995 | Tomiyama |
| 5,432,027 A | 7/1995 | Tuttle et al. |
| 5,470,357 A | 11/1995 | Schmutz et al. |
| 5,567,538 A | 10/1996 | Oltman et al. |
| 5,603,737 A | 2/1997 | Marincic et al. |
| 5,626,988 A | 5/1997 | Daniel-Ivad et al. |
| 5,631,104 A | 5/1997 | Zhong et al. |
| 5,639,569 A | 6/1997 | Köhler et al. |
| 5,654,114 A | 8/1997 | Kubota et al. |
| 5,698,340 A | 12/1997 | Xue et al. |
| 5,792,574 A | 8/1998 | Mitate et al. |
| 5,912,091 A | 6/1999 | Daio et al. |
| 6,042,625 A | 3/2000 | Daio et al. |
| 6,045,944 A | 4/2000 | Okada et al. |
| 6,066,184 A | 5/2000 | Brenner |
| 6,143,440 A | 11/2000 | Volz et al. |
| 6,221,524 B1 | 4/2001 | Andrew et al. |
| 6,245,452 B1 | 6/2001 | Oltman |
| 6,265,100 B1 | 7/2001 | Saaski et al. |
| 6,277,522 B1 | 8/2001 | Omaru et al. |
| 6,277,752 B1 | 8/2001 | Chen |
| 6,287,719 B1 | 9/2001 | Bailey |
| 6,312,848 B1 | 11/2001 | Kilb et al. |
| 6,379,839 B1 | 4/2002 | Inoue et al. |
| 6,443,999 B1 | 9/2002 | Cantave et al. |
| 6,468,691 B1 | 10/2002 | Malay et al. |
| 6,495,293 B1 | 12/2002 | Arai et al. |
| 6,516,266 B2 | 2/2003 | Shoji |
| 6,682,853 B2 | 1/2004 | Kimijima et al. |
| 6,723,466 B2 | 4/2004 | Oogami et al. |
| 6,884,541 B2 | 4/2005 | Enomoto et al. |
| 6,896,994 B2 | 5/2005 | Urairi et al. |
| 6,964,690 B2 | 11/2005 | Goda et al. |
| 7,108,941 B2 | 9/2006 | Hayashi et al. |
| 7,195,840 B2 | 3/2007 | Kaun |
| 7,276,092 B2 | 10/2007 | Holl et al. |
| 7,341,802 B1 | 3/2008 | Ota et al. |
| 7,432,014 B2 | 10/2008 | Konishiike et al. |
| 7,455,929 B2 | 11/2008 | Dopp et al. |
| 7,488,553 B2 | 2/2009 | Tsukamoto et al. |
| 7,566,515 B2 | 7/2009 | Suzuki et al. |
| 7,575,830 B2 | 8/2009 | Kawamura et al. |
| 7,579,105 B2 | 8/2009 | Yoppolo et al. |
| 7,582,387 B2 | 9/2009 | Howard et al. |
| 7,641,992 B2 | 1/2010 | Howard et al. |
| 7,642,013 B2 | 1/2010 | Howard et al. |
| 7,662,509 B2 | 2/2010 | Howard et al. |
| 7,745,041 B2 | 6/2010 | Kozuki et al. |
| 7,794,869 B2 | 9/2010 | Howard et al. |
| 7,803,481 B2 | 9/2010 | Howard et al. |
| 7,811,708 B2 | 10/2010 | Lampe-Onnerud et al. |
| 7,816,026 B2 | 10/2010 | Janmey |
| 7,858,236 B2 | 12/2010 | Howard et al. |
| 7,883,790 B2 | 2/2011 | Howard et al. |
| 7,931,980 B2 | 4/2011 | Kwak et al. |
| 7,951,476 B2 | 5/2011 | Kim |
| 7,981,541 B2 | 7/2011 | Sato et al. |
| 8,021,775 B2 | 9/2011 | Kaun |
| 8,048,570 B2 | 11/2011 | Visco et al. |
| 8,236,441 B2 | 8/2012 | Gardner et al. |
| 8,435,658 B2 | 5/2013 | Yamashita et al. |
| 8,465,860 B2 | 6/2013 | Pozin et al. |
| 8,703,327 B2 | 4/2014 | Kim et al. |
| 9,077,022 B2 | 7/2015 | Howard et al. |
| 9,899,640 B2 | 2/2018 | Yabushita et al. |
| 2001/0009737 A1 | 7/2001 | Lane |
| 2001/0016282 A1 | 8/2001 | Kilb et al. |
| 2002/0034680 A1 | 3/2002 | Inoue et al. |
| 2002/0106559 A1 | 8/2002 | Takahashi et al. |
| 2002/0146621 A1 | 10/2002 | Yageta et al. |
| 2002/0192559 A1 | 12/2002 | Yoshimura et al. |
| 2003/0003370 A1 | 1/2003 | Arai et al. |
| 2003/0013007 A1 | 1/2003 | Kaun |
| 2003/0068557 A1 | 4/2003 | Kumashiro et al. |
| 2003/0138693 A1 | 7/2003 | Suzuki et al. |
| 2003/0162088 A1 | 8/2003 | Nakanishi et al. |
| 2003/0175589 A1 | 9/2003 | Kaminaka et al. |
| 2003/0193317 A1 | 10/2003 | Shimamura et al. |
| 2004/0029004 A1 | 2/2004 | Miyaki |
| 2004/0048151 A1 | 3/2004 | Hayashi et al. |
| 2004/0048160 A1 | 3/2004 | Omaru |
| 2004/0081895 A1 | 4/2004 | Adachi et al. |
| 2004/0110061 A1 | 6/2004 | Haug et al. |
| 2004/0115521 A1 | 6/2004 | Cho |
| 2004/0202933 A1 | 10/2004 | Yamaki et al. |
| 2004/0237290 A1 | 12/2004 | Ura |
| 2005/0042506 A1 | 2/2005 | Tomimoto et al. |
| 2005/0058904 A1 | 3/2005 | Kano et al. |
| 2005/0064283 A1 | 3/2005 | Anderson et al. |
| 2005/0074667 A1 | 4/2005 | Yang |

(56) References Cited

U.S. PATENT DOCUMENTS

| | | |
|---|---|---|
| 2005/0142440 A1 | 6/2005 | Yamaki et al. |
| 2005/0171383 A1 | 8/2005 | Arai et al. |
| 2005/0181276 A1 | 8/2005 | Miyaki |
| 2005/0233212 A1 | 10/2005 | Kaun |
| 2005/0271938 A1 | 12/2005 | Suzuki et al. |
| 2006/0019131 A1 | 1/2006 | Akiyama et al. |
| 2006/0093894 A1 | 5/2006 | Scott et al. |
| 2006/0124973 A1 | 6/2006 | Arai et al. |
| 2006/0183020 A1 | 8/2006 | Davidson et al. |
| 2006/0228629 A1 | 10/2006 | Christian et al. |
| 2007/0037058 A1 | 2/2007 | Visco et al. |
| 2007/0117011 A1 | 5/2007 | Myerberg et al. |
| 2007/0122698 A1 | 5/2007 | Mitchell et al. |
| 2007/0172728 A1 | 7/2007 | Yamashita et al. |
| 2007/0200101 A1 | 8/2007 | Asao et al. |
| 2008/0003500 A1 | 1/2008 | Issaev et al. |
| 2008/0003503 A1 | 1/2008 | Kawakami et al. |
| 2008/0050652 A1 | 2/2008 | Hirose et al. |
| 2008/0240480 A1 | 10/2008 | Pinnell et al. |
| 2008/0241645 A1 | 10/2008 | Pinnell et al. |
| 2008/0318126 A1 | 12/2008 | Ishii |
| 2009/0123840 A1 | 5/2009 | Shirane et al. |
| 2009/0208849 A1 | 8/2009 | Pozin et al. |
| 2009/0325062 A1 | 12/2009 | Brenner et al. |
| 2010/0196756 A1 | 8/2010 | Wakita et al. |
| 2010/0227217 A1 | 9/2010 | Fujikawa et al. |
| 2010/0266893 A1 | 10/2010 | Martin et al. |
| 2011/0091753 A1 | 4/2011 | Wang et al. |
| 2011/0200871 A1 | 8/2011 | Pytlik et al. |
| 2012/0015224 A1 | 1/2012 | Pytlik et al. |
| 2012/0028110 A1 | 2/2012 | Brenner |
| 2012/0058386 A1* | 3/2012 | Wyser ............... H01M 10/0427 429/162 |
| 2012/0100406 A1 | 4/2012 | Gaugler |
| 2013/0130066 A1 | 5/2013 | Pytlik et al. |
| 2013/0216881 A1 | 8/2013 | Gaugler |

FOREIGN PATENT DOCUMENTS

| | | |
|---|---|---|
| CN | 2502410 Y | 7/2002 |
| CN | 2632871 Y | 8/2004 |
| CN | 1630126 A | 6/2005 |
| CN | 1744347 A | 3/2006 |
| CN | 2847540 Y | 12/2006 |
| CN | 2874790 Y | 2/2007 |
| CN | 1960040 A | 5/2007 |
| CN | 101120462 A | 2/2008 |
| CN | 101202357 A | 6/2008 |
| CN | 101217188 A | 7/2008 |
| CN | 101286572 A | 10/2008 |
| CN | 101517820 A | 8/2009 |
| CN | 201440429 U | 4/2010 |
| DE | 3113309 A1 | 10/1982 |
| DE | 3638793 A1 | 5/1988 |
| DE | 19647593 A1 | 5/1998 |
| DE | 69700312 T2 | 2/2000 |
| DE | 19857638 A1 | 6/2000 |
| DE | 102009008859 A1 | 8/2010 |
| DE | 102009017514 A1 | 10/2010 |
| EP | 0202857 B1 | 7/1991 |
| EP | 0829105 A1 | 3/1998 |
| EP | 1137091 A1 | 9/2001 |
| EP | 1315220 A1 | 5/2003 |
| EP | 1318561 A1 | 6/2003 |
| EP | 1339115 A1 | 8/2003 |
| EP | 1372209 A1 | 12/2003 |
| EP | 1266413 B1 | 5/2005 |
| EP | 1808916 A1 | 7/2007 |
| EP | 1873846 A1 | 1/2008 |
| EP | 1886364 A1 | 2/2008 |
| EP | 1968134 A1 | 9/2008 |
| GB | 1088271 A | 10/1967 |
| GB | 1332944 A | 10/1973 |
| GB | 2110464 A | 6/1983 |
| JP | S58-10375 A | 1/1983 |
| JP | S5842167 A | 3/1983 |
| JP | S58-154178 A | 9/1983 |
| JP | S59-78460 A | 5/1984 |
| JP | S60-148058 A | 8/1985 |
| JP | S62-113358 A | 5/1987 |
| JP | S62-139265 A | 6/1987 |
| JP | S62-272472 A | 11/1987 |
| JP | S63-285878 A | 11/1988 |
| JP | H01-307176 A | 12/1989 |
| JP | H01309254 A | 12/1989 |
| JP | H02-56871 A | 2/1990 |
| JP | H02-60072 A | 2/1990 |
| JP | H03-225748 A | 10/1991 |
| JP | H04-162351 A | 6/1992 |
| JP | H04-249073 A | 9/1992 |
| JP | H05-121056 A | 5/1993 |
| JP | H06-96750 A | 4/1994 |
| JP | H07-153467 A | 6/1995 |
| JP | H07-153488 A | 6/1995 |
| JP | H08-293299 A | 11/1996 |
| JP | H0992335 A | 4/1997 |
| JP | H11-40189 A | 2/1999 |
| JP | H11-135101 A | 5/1999 |
| JP | H11176414 A | 7/1999 |
| JP | 2937456 B2 | 8/1999 |
| JP | H11245066 A | 9/1999 |
| JP | H11-345626 A | 12/1999 |
| JP | H11-354150 A | 12/1999 |
| JP | 4263308 B2 | 2/2000 |
| JP | 2000-77040 A | 3/2000 |
| JP | 2000082486 A | 3/2000 |
| JP | 2000-164259 A | 6/2000 |
| JP | 2000156218 A | 6/2000 |
| JP | 2000306597 A | 11/2000 |
| JP | 2000331717 A | 11/2000 |
| JP | 20011448238 A | 5/2001 |
| JP | 2002-042744 A | 2/2002 |
| JP | 2002-100408 A | 4/2002 |
| JP | 2002117900 A | 4/2002 |
| JP | 2002-134073 A | 5/2002 |
| JP | 2002-134096 A | 5/2002 |
| JP | 2002-164076 A | 6/2002 |
| JP | 2002-289257 A | 10/2002 |
| JP | 2002-289259 A | 10/2002 |
| JP | 2002-289260 A | 10/2002 |
| JP | 2002-298803 A | 10/2002 |
| JP | 2002-324584 A | 11/2002 |
| JP | 2002-352789 A | 12/2002 |
| JP | 2003-031266 A | 1/2003 |
| JP | 2003-077543 A | 3/2003 |
| JP | 2003-123830 A | 4/2003 |
| JP | 2003217562 A | 7/2003 |
| JP | 2003-249201 A | 9/2003 |
| JP | 2004-139800 A | 5/2004 |
| JP | 2004-158318 A | 6/2004 |
| JP | 2004-362968 A | 12/2004 |
| JP | 2006-040596 A | 2/2006 |
| JP | 2006040598 A | 2/2006 |
| JP | 3902330 B2 | 4/2007 |
| JP | 2007-200683 A | 8/2007 |
| JP | 2007-220601 A | 8/2007 |
| JP | 2007207535 A | 8/2007 |
| JP | 2007-294111 A | 11/2007 |
| JP | 2008-047303 A | 2/2008 |
| JP | 2008006640 A | 3/2008 |
| JP | 2008103109 A | 5/2008 |
| JP | 2008198552 A | 8/2008 |
| JP | 2008-251192 A | 10/2008 |
| JP | 2008-262825 A | 10/2008 |
| JP | 2008-262826 A | 10/2008 |
| JP | 2008-262827 A | 10/2008 |
| JP | 2009-199761 A | 9/2009 |
| JP | 4866496 B2 | 2/2012 |
| KR | 20030087316 A | 11/2003 |

(56) References Cited

FOREIGN PATENT DOCUMENTS

WO     WO 2008118478 A1    10/2008
WO     WO 2010/089152 A1    8/2010

OTHER PUBLICATIONS

Qu, Guoqiang, "Initial Analysis on the Working Principle of Through the Partition Welding," Feb. 1989.
Yi, Si-ping et al. "Laser Auto-Welding for Lithium Battery Tab," Chinese Journal of Power Sources, vol. 29, No. 2, pp. 80-81, Feb. 2005.
"Button Cell," *Electropedia*, International Electrotechnical Commission, Apr. 2004.
"Notification of invalidation request acceptance" against Chinese patent No. 201080036551.3, Jan. 2020.
"Annulment" against EP 2 394 324 B1, Jan. 22, 2020.
"Complaint for Patent Infringement" of U.S. Pat. Nos. 9,153,835; 9,496,581; and 9,799,913 against Samsung Electronics America, Inc., Feb. 5, 2020.
Linden, D. et al. "Handbook of Batteries," 2002, Third Edition, The McGraw-Hill Companies, Inc., Sections 11.4, 11.4.1, 14.1,14.5.2, 14.8 and 14.8.2, and Figs. 11.2, 11.5, 14.38, 34.13, 35.30 and 35.32.
"Complaint for Patent Infringement" of U.S. Pat. Nos. 9,153,835; 9,496,581; and 9,799,913 against Amazon.com, Inc., Feb. 24, 2020.
"Complaint for Patent Infringement" of U.S. Pat. Nos. 9,153,835; 9,496,581; 9,799,913; and 9,799,858 against Best Buy Co., Inc., Feb. 24, 2020.
"Complaint for Patent Infringement" of U.S. Pat. Nos. 9,153,835; 9,496,581; and 9,799,913 against Costco Wholesale Corporation, Feb. 24, 2020.
"Complaint for Patent Infringement" of U.S. Pat. Nos. 9,153,835; 9,496,581; 9,799,913; and 9,799,858 against Audio Partnership LLC and Audio Partnership PLC, Mar. 3, 2020.
"Complaint for Patent Infringement" of U.S. Pat. Nos. 9,153,835; 9,496,581; 9,799,913; and 9,799,858 against PEAG, LLC, Mar. 4, 2020.
InvenTek Corp., "Our Technology," Dec. 6, 2004, https://web.archive.org/web/20041206230046/http://inventekcorp.com/page3.html.
InvenTek Corporation, "Powerful Design: Technology," Nov. 22, 2007, https://web.archive.org/web/20071122010915/http://inventekcorp.com/technology.html.
InvenTek Corporation, "Powerful Design: Partners," Nov. 22, 2007, https://web.archive.org/web/20071122011734/http://inventekcorp.com/partners.html.
Saft Specialty Battery Group, "Premium lithium battery LM 17130," Doc. No 31089-2-0908, Sep. 2008.
Saft, "Premium lithium battery LM 22150," Doc N° 32040-2-0313, Mar. 2013.
Saft Specialty Battery Group, "Premium lithium battery LO 34 SX," Doc N° 31099-2-0411, Apr. 2011.
Saft Specialty Battery Group, "Rechargeable lithium-ion battery VL 34480," Doc. N° 54054-2-0607, Jun. 2007.
Saft, "Saft lithium batteries: Selector guide," Doc. N° 54083-2-0320, Mar. 2020.
Saft, "Saft lithium batteries: Selector guide," Doc. N° 54083-2-0613, Jun. 2013.
Saft Specialty Battery Group, "Saft lithium-ion rechargeable batteries for transportable power applications," Doc. N° 54047-2-0706, Jul. 2006.
Ultralife Corporation, "UB0006," https://www.ultralifecorporation.com/ECommerce/product/ub0006/type-ba-5367-33v-limno2, retrieved Jul. 15, 2020.
Ultralife Batteries, Inc., "UB0006: BA-5367/U" https://web.archive.org/web/20061109153052/http://www.ultralifebatteries.com/datasheet.php?ID=UB0006#top, Nov. 9, 2006.
Ultralife Batteries, Inc., "BA-5367/U Technical Datasheet," Aug. 4, 2006.
Ultralife Corporation, "BA-5367/U Technical Datasheet," Aug. 27, 2015.
Ultralife Batteries, Inc., "Product Summary Guide: Technical Datasheet," Sep. 27, 2006.
Ultralife Batteries, Inc., "Ultralife: Lithium-Manganese Dioxide Primary and Lithium Ion Rechargeable Batteries," Dec. 13, 2004.
Ultralife Corporation, "Lithium Carbon Mono-fluoride / Manganese Dioxide Hybrid Application Guide," Apr. 2, 2014.
Defendants' P.R. 3-3 Invalidity Contentions, Jul. 10, 2020.
Petition for Inter Partes Review of U.S. Pat. No. 9,799,858, Jul. 7, 2020.
Petition for Inter Partes Review of U.S. Pat. No. 9,153,835, Jul. 7, 2020.
Petition for Inter Partes Review of U.S. Pat. No. 9,496,581, Jul. 7, 2020.
Petition for Inter Partes Review of U.S. Pat. No. 9,799,913, Jul. 7, 2020.
Exhibit 1 of Defendant's Invalidity Contentions, Jul. 10, 2020.
Exhibit 2 of Defendant's Invalidity Contentions, Jul. 10, 2020.
Exhibit 3 of Defendant's Invalidity Contentions, Jul. 10, 2020.
Exhibit 4 of Defendant's Invalidity Contentions, Jul. 10, 2020.
Exhibit 5 of Defendant's Invalidity Contentions, Jul. 10, 2020.
Exhibit 6 of Defendant's Invalidity Contentions, Jul. 10, 2020.
Exhibit 7 of Defendant's Invalidity Contentions, Jul. 10, 2020.
Exhibit 8 of Defendant's Invalidity Contentions, Jul. 10, 2020.
Exhibit 9 of Defendant's Invalidity Contentions, Jul. 10, 2020.
Exhibit 10 of Defendant's Invalidity Contentions, Jul. 10, 2020.
Exhibit 11 of Defendant's Invalidity Contentions, Jul. 10, 2020.
Jul. 10, 2020 Statement of Thomas Kaun.
Patent Owner's Preliminary Response, Case IPR 2020-01211, Patent 9,496,581, Oct. 7, 2020.
Patent Owner's Preliminary Response, Case IPR 2020-01212, Patent 9,153,835, Oct. 7, 2020.
Patent Owner's Preliminary Response, Case IPR 2020-01213, Patent 9,799,858, Oct. 7, 2020.
Patent Owner's Preliminary Response, Case IPR 2020-01214, Patent 9,799,913, Oct. 7, 2020.
Declaration of Dr. Martin Peckerar Regarding Claim Construction, Oct. 23, 2020.
Declaration of William H. Gardner, Jul. 7, 2020.
Supplemental Expert Declaration of William H. Gardner, Oct. 23, 2020.
William H. Gardner CV, Oct. 7, 2020.
Frankenberger, Martin et al. "Laminated Lithium Ion Batteries with improved fast charging capability," Journal of Electroanalytical Chemistry 837 (2019) 151-158, Elsevier B.V., Feb. 17, 2019.
Chart comparing U.S. Pat. No. 9,799,858 to PCT/EP2010/058637, Jul. 7, 2020.
Email chain re: *VARTA* v. *PEAG LLC* (E.D.Tex. No. 2:20-71) and *VARTA* v. *Audio Partnership LLC* (N.D.Ill. No. 1:20-1568), Apr. 27, 2020.
First Amended Consolidation Order, Case No. 2:20-cv-00051, Document 21, filed May 7, 2020.
Discovery Order in Civil Action Nos. 2:20-00029, 2:20-00071, 2:20-00138; Case No. 2:20-cv-00051-JRG; Document 51; filed Jun. 10, 2020.
Docket Control Order, Case No. 2:20-cv-00051-JRG, Document 54, filed Jun. 11, 2020.
Defendants PEAG, LLC D/B/A JLAB Audio, Audio Partnership LLC and Audio Partnership PLC D/B/A Cambridge Audio's Opposed Motion to Stay Pending Inter Partes Review in Case Nos. 2:20-CV-00071 and 2:20-CV-00138; Case 2:20-cv-0051-JRG; Document 64; filed Aug. 20, 2020.
Plaintiff VARTA Microbattery GmbH's Opposition to Defendants' Motion to Stay Pending Inter Partes Review, Case 2:20-cv-00051-JRG, Document 65, filed Sep. 3, 2020.
Order denying stay, Case 2:20-cv-00051-JRG, Document 68, filed Oct. 6, 2020.
Complaint for Patent Infringement of U.S. Pat. Nos. 9,153,835; 9,496,581; 9,799,913; and 9,799,858 against Cambridge Audio, Case 2:20-cv-00138, Document 1, filed May 4, 2020.

(56) References Cited

OTHER PUBLICATIONS

Defendant PEAG, LLC D/B/A JLAB Audio's Answer to Complaint for Patent Infringement, Case 2:20-cv-00051-JRG, Document 26, filed May 13, 2020.
Joint Motion for Entry of Docket Control Order, Case 2:20-cv-00051-JRG, Document 45, filed Jun. 8, 2020.
Translation of KR20030087316, Jun. 12, 2020.
"VARTA's Opening Claim Construction Brief," with Exhibits, Case 2:20-cv-00051-JRG, Document 77, filed Dec. 4, 2020.
"Defendants' Responsive Claim Construction Brief in Case Nos. 2:20-CV-00071 and 2:20-CV-00138," with Exhibits, Case 2:20-cv-00051-JRG, Document 80, filed Dec. 18, 2020.
"VARTA's Reply Claim Construction Brief," Case 2:20-cv-00051-JRG, Document 81, filed Dec. 28, 2020.
"Patent Rule 4-5(d) Joint Claim Construction Chart," with Exhibits, Case 2:20-cv-00051-JRG, Document 84, filed Jan. 4, 2021.
IPR2020-01211 Petitioner Response with Exhibits, Jun. 23, 2021.
IPR2020-01211 Petitioner Opposition to Motion to Amend with Exhibits, Jun. 23, 2021.
IPR2020-01212 Petitioner Response with Exhibits, Jun. 23, 2021.
IPR2020-01212 Petitioner Opposition to Motion to Amend with Exhibits, Jun. 23, 2021.
IPR2020-01213 Petitioner Response with Exhibits, Jun. 23, 2021.
IPR2020-01213 Petitioner Opposition to Motion to Amend with Exhibits, Jun. 23, 2021.
IPR2020-01214 Petitioner Response with Exhibits, Jun. 23, 2021.
IPR2020-01214 Petitioner Opposition to Motion to Amend with Exhibits, Jun. 23, 2021.
IPR2021-00474 Petition for IPR of U.S. Pat. No. 9,496,581 with Exhibits, Feb. 2, 2021.
IPR2021-00474 Notice of Filing Date Accorded to Petition and Time for Filing Patent Owner Preliminary Response, Feb. 10, 2021.
IPR2021-00474 Petitioner Eve Energy Co., Ltd.'s Power of Attorney, Feb. 1, 2021.
IEC, International Standard, Primary batteries—Part 2: Physical and electrical specifications, IEC 60086-2, eleventh edition, Dec. 2006, International Electrotechnical Commission, Switzerland, pp. 1-64.
IPR2021-01207 Petition for IPR of U.S. Pat. No. 10,804,506 with Exhibits, Jun. 30, 2021.
"Declaration of William H. Gardner," IPR2021-01206 and IPR2021-01207, Jun. 29, 2021.
IPR2021-01206 Petition for IPR of U.S. Pat. No. 10,971,776 with Exhibits, Jun. 30, 2021.
IPR 2020-01211 Patent Owner's Response with Exhibits, Mar. 31, 2021.
IPR 2020-01212 Patent Owner's Response with Exhibits, Mar. 31, 2021.
IPR 2020-01213 Patent Owner's Response with Exhibits, Mar. 31, 2021.
IPR 2020-01214 Patent Owner's Response with Exhibits, Mar. 31, 2021.
IPR 2020-01211 Patent Owner's Contingent Motion to Amend with Exhibits, Mar. 31, 2021.
IPR 2020-01212 Patent Owner's Contingent Motion to Amend with Exhibits, Mar. 31, 2021.
IPR 2020-01213 Patent Owner's Contingent Motion to Amend with Exhibits, Mar. 31, 2021.
IPR 2020-01214 Patent Owner's Contingent Motion to Amend with Exhibits, Mar. 31, 2021.
Decision Granting Institution of Inter Partes Review, Case IPR 2020-01211, U.S. Pat. No. 9,496,581, Jan. 6, 2021.
Decision Granting Institution of Inter Partes Review, Case IPR 2020-01212, U.S. Pat. No. 9,153,835, Jan. 6, 2021.
Decision Granting Institution of Inter Partes Review, Case IPR 2020-01213, U.S. Pat. No. 9,799,858, Jan. 6, 2021.
Decision Granting Institution of Inter Partes Review, Case IPR 2020-01214, U.S. Pat. No. 9,979,913, Jan. 6, 2021.
IPR2020-01211, U.S. Pat. No. 9,496,581, Patent Owner's Reply in Support of its Revised Contingent Motion to Amend with New Exhibit, Oct. 8, 2021.
IPR2020-01212, U.S. Pat. No. 9,153,835, Patent Owner's Reply in Support of its Revised Contingent Motion to Amend with New Exhibit, Oct. 8, 2021.
IPR2020-01213, U.S. Pat. No. 9,799,858, Patent Owner's Reply in Support of its Revised Contingent Motion to Amend with New Exhibit, Oct. 8, 2021.
IPR2020-01214, U.S. Pat. No. 9,799,913, Patent Owner's Reply in Support of its Revised Contingent Motion to Amend with New Exhibit, Oct. 8, 2021.
IPR2021-01206, U.S. Pat. No. 10,971,776, Patent Owner's Preliminary Response, Oct. 12, 2021.
IPR2021-01207, U.S. Pat. No. 10,804,506, Patent Owner's Preliminary Response, Oct. 12, 2021.
IPR2021-00474, U.S. Pat. No. 9,496,581, Paper 6, Patent Owner's Preliminary Response with Exhibit, Jul. 13, 2021.
IPR2021-00474, U.S. Pat. No. 9,496,581, Paper 10, Decision Granting IPR, Aug. 9, 2021.
IPR2020-01212, U.S. Pat. No. 9,153,835, Paper 27, Patent Owner's Revised Contingent Motion to Amend with Exhibits, Aug. 4, 2021.
IPR2020-01212, U.S. Pat. No. 9,153,835, Paper 28, Patent Owner's Sur-Reply with Exhibits, Aug. 4, 2021.
IPR2020-01211, U.S. Pat. No. 9,496,581, Paper 28, Patent Owner's Revised Contingent Motion to Amend with Exhibits, Aug. 4, 2021.
IPR2020-01211, U.S. Pat. No. 9,496,581, Paper 29, Patent Owner's Sur-Reply with Exhibits, Aug. 4, 2021.
IPR2020-01213, U.S. Pat. No. 9,799,858, Paper 28, Patent Owner's Revised Contingent Motion to Amend with Exhibits, Aug. 4, 2021.
IPR2020-01213, U.S. Pat. No. 9,799,858, Paper 29, Patent Owner's Sur-Reply with Exhibits, Aug. 4, 2021.
IPR2020-01214, U.S. Pat. No. 9,799,913, Paper 27, Patent Owner's Revised Contingent Motion to Amend with Exhibits, Aug. 4, 2021.
IPR2020-01214, U.S. Pat. No. 9,799,913, Paper 28, Patent Owner's Sur-Reply with Exhibits, Aug. 4, 2021.
IPR2020-01211, U.S. Pat. No. 9,496,581, Paper 35, Petitioner's Opposition to Patent Owner's Revised Contingent Motion to Amend with Exhibits, Sep. 17, 2021.
IPR2020-01212, U.S. Pat. No. 9,153,835, Paper 34, Petitioner's Opposition to Patent Owner's Revised Contingent Motion to Amend with Exhibits, Sep. 17, 2021.
IPR2020-01213, U.S. Pat. No. 9,799,858, Paper 35, Petitioner's Opposition to Patent Owner's Revised Contingent Motion to Amend with Exhibits, Sep. 17, 2021.
IPR2020-01214, U.S. Pat. No. 9,799,913, Paper 34, Petitioner's Opposition to Patent Owner's Revised Contingent Motion to Amend with Exhibits, Sep. 17, 2021.
IPR2021-00474, U.S. Pat. No. 9,496,581, Patent Owner's Contingent Motion to Amend with Exhibits, Nov. 8, 2021.
IPR2021-00474, U.S. Pat. No. 9,496,581, Patent Owner's Response with Exhibits, Nov. 8, 2021.
IPR2021-01207, U.S. Pat. No. 10,804,506, Decision Denying Institution of Inter Partes Review, Jan. 5, 2022.
IPR2021-01206, U.S. Pat. No. 10,971,776, Decision Denying Institution of Inter Partes Review, Jan. 5, 2022.
IPR2020-01214, U.S. Pat. No. 9,799,913, Judgment Final Written Decision, Jan. 5, 2022.
IPR2020-01212, U.S. Pat. No. 9,153,835, Judgment Final Written Decision, Jan. 5, 2022.
IPR2020-01213, U.S. Pat. No. 9,799,858, Judgment Final Written Decision, Jan. 5, 2022.
IPR2020-01211, U.S. Pat. No. 9,496,581, Judgment Final Written Decision, Jan. 5, 2022.
U.S. Appl. No. 15/433,654, filed Feb. 15, 2017.
U.S. Appl. No. 15/699,435, filed Sep. 8, 2017.
U.S. Appl. No. 16/693,538, filed Nov. 25, 2019.
U.S. Appl. No. 16/796,977, filed Feb. 21, 2020.
U.S. Appl. No. 16/798,509, filed Feb. 24, 2020.
U.S. Appl. No. 15/696,354, filed Sep. 6, 2017.
U.S. Appl. No. 16/812,482, filed Mar. 9, 2020.
U.S. Appl. No. 16/813,776, filed Mar. 10, 2020.
U.S. Appl. No. 16/810,976, filed Mar. 6, 2020.

(56) References Cited

OTHER PUBLICATIONS

U.S. Appl. No. 16/810,998, filed Mar. 6, 2020.
"Notice of acceptance of request for invalidation" against Chinese patent application No. 201080007121.9, dated Jun. 17, 2020.
U.S. Appl. No. 17/173,257, filed Feb. 11, 2021.
U.S. Appl. No. 17/173,222, filed Feb. 11, 2021.
IPR2021-00474, U.S. Pat. No. 9,496,581, Petitioner's Reply to Patent Owner Response with Exhibit, Jan. 31, 2022.
IPR2021-00474, U.S. Pat. No. 9,496,581, Petitioner's Opposition to Patent Owner's Contingent Motion to Amend with Exhibit, Jan. 31, 2022.
IPR2021-00474, U.S. Pat. No. 9,496,581, Patent Owner's Sur-Reply, Mar. 7, 2022.
IPR2021-00474, U.S. Pat. No. 9,496,581, Patent Owner's Reply in Support of its Contingent Motion to Amend with Exhibit, Mar. 7, 2022.
IPR2021-00474, U.S. Pat. No. 9,496,581, Petitioner's Sur-Reply to Patent Owner's Reply to Contingent Motion to Amend, Apr. 18, 2022.
Martin, Charles E. et al. "Method and Design for Externally Applied Laser Welding of Internal Connections in a High power Electrochemical Cell," U.S. Appl. No. 61/117,760, Nov. 25, 2008, pp. 1-33, Exhibit 14 of Expert Report of William H. Gardner dated Feb. 10, 2022.
Nilsson, Johan and David N. Payne, "High-Power Fiber Lasers," Science, vol. 332, AAAS, US, May 20, 2011, pp. 921-922, Exhibit 19 of Expert Report of William H. Gardner dated Feb. 10, 2022.
Jeong, Y. et al. "Ytterbium-doped large-core fiber laser with 1.36 kW continuous-wave output power," Optics Express, vol. 12, No. 25, Dec. 13, 2004, The Optical Society, US, pp. 6088-6092, Exhibit 21 of Expert Report of William H. Gardner dated Feb. 10, 2022.
Gardner, William H., "Expert Report of William H. Gardner Regarding Invalidity of the Asserted Claims of U.S. Pat. Nos. 10,804,506 & 10,971,776," Feb. 10, 2022, pp. 1-158.
Petition for IPR of U.S. Pat. No. 9,153,835, IPR2022-01484, Sep. 7, 2022.
Declaration of Marc Juzkow; IPR2022-01484, IPR2022-01486, IPR2022-01487, Ex. 1002; Sep. 7, 2022.
Translation by David Takata of JP 2007294111 Kobayashi, Apr. 28, 2022.
Translation by MultiLing of DE 102005058132 Brenner, Aug. 4, 2022.
"Engineering Properties of Polyethylene," Chapter 1, American Water Works Association Manual M55, Dec. 2005, pp. 1-19.
Petition for IPR of U.S. Pat. No. 9,799,913, IPR2002-01487, Sep. 7, 2022.
Petition for IPR of U.S. Pat. No. 9,496,581, IPR2002-01486, Sep. 7, 2022.
Judgement Final Written Decision, IPR2021-00474, U.S. Pat. No. 9,496,581, Paper 30, Aug. 8, 2022.
Merriam-Webster, "Definition of Strip", retrieved Feb. 2, 2021, pp. 1-10.
Petition for IPR of U.S. Pat. No. 11,024,904, IPR2022-01473, Sep. 1, 1022.
Declaration of Marc Juzkow in support of Petition for IPR2022-01473, Ex. 1002. Aug. 31, 2022, pp. 1-109.
Marc Juzkow CV, pp. 1-3, Ex. 1003, IPR2022-01473.
Petition for IPR of U.S. Pat. No. 11,024,905, IPR2022-01474, Sep. 1, 2022.
Petitioner's Ranking of Petitions and Explanation of Differences Between Petitions, IPR2022-01474, U.S. Pat. No. 11,024,905, Sep. 1, 2022.
Petition for IPR of U.S. Pat. No. 11,024,905, IPR2022-01474, Sep. 2, 2022.
Declaration of Marc Juzkow in support of Petition for IPR2022-01474, Ex. 1002, Aug. 31, 2022, pp. 1-89.
Petition for IPR of U.S. Pat. No. 11,024,905, IPR2022-01476, Sep. 1, 2022.
Petitioner's Ranking of Petitions and Explanation of Differneces Between Petitions, IPR2022-01476, U.S. Pat. No. 11,024,905, Sep. 1, 2022.
Petition for IPR of U.S. Pat. No. 11,024,905, IPR2022-01476, Sep. 2, 2022.
Declaration of Marc Juzkow in support of Petition for IPR2022-01476, Ex. 1002. Aug. 31, 2022, pp. 1-90.
Petition for IPR of U.S. Pat. No. 11,024,907, IPR2022-01477, Sep. 1, 2022.
Petitioner's Ranking of Petitions and Explanation of Differences Between Petitions IPR2022-01477, U.S. Pat. No. 11,024,907, Sep. 1, 2022.
Declaration of Marc Juzkow in support of Petition for IPR2022-01477, Ex. 1002. Aug. 31, 2022, pp. 1-106.
Petition for IPR of U.S. Pat. No. 11,024,907, IPR2022-01478, Sep. 1, 2022.
Petitioner's Ranking of Petitions and Explanation of Differences Between Petitions, IPR2022-01478, U.S. Pat. No. 11,024,907, Sep. 1, 2022.
Declaration of Marc Juzkow in support of Petition for IPR2022-01478, Ex. 1002, Aug. 31, 2022, pp. 1-102.
Record of Oral Hearing held May 24, 2022, IPR2021-00474, U.S. Pat. No. 9,496,581, Paper 29.
Petitioner's Sur-repley to Patent Owner's Revised Contingent MTA, IPR2020-01211, U.S. Pat. No. 9,496,581, Oct. 27, 2021.
Petitioner's Sur-reply to Patent Owner's Revised Contingent MTA, IPR2020-01212, U.S. Pat. No. 9,153,835, Oct. 27, 2021.
Petitioner's Sur-reply to Patent Owner's Revised Contingent MTA, IPR2020-01213, U.S. Pat. No. 9,799,858, Oct. 27, 2021.
Petitioner's Sur-reply to Patent Owner's Revised Contingent MTA, IPR2020-01214, U.S. Pat. No. 9,799,913, Oct. 27, 2021.
Defendants' P.R.3-3 Invalidity Contentions in IPR2021,01207, Ex. 2005, Sep. 10, 2021.
Defendants' P.R.3-3 Invalidity Contentions in IPR2021-01206 (excerpts), Ex. 2005, Sep. 10, 2021.
Complaint for Patent Infringement, Audio Partnership, case 2:21-cv-00400, Oct. 25, 2021.
Complaint for Patent Infringement, EVE, case 2:21-cv-00399, Oct. 25, 2021.
Varta Microbattery GmbH's Disclosure of Asserted Claims and Infringement Contentions, case No. 2:21-cv-00400-JRG-RSP, Audio Partnership/Cambridge Audio, Mar. 2, 2022.
Varta Microbattery GmbH's Amended Disclosure of Asserted Claims and Infringement Contentiosn, case No. 2:21-cv-00399-JRG-RSP, Eve, Apr. 13, 2022.
Varta Microbattery GmbH's Disclosure of Asserted Claims and Infringement Contentiosn, case No. 2:21-cv-00399-JRG-RSP, Eve, Mar. 2, 2022.
Eve Energy Co., Ltd.'s Patent Invalidity Contentions, case No. 2:21-cv-00399-JRG-RSP.
Petition for Inter Partes Review; IPR2023-00121, U.S. Pat. No. 11,258,092, Nov. 2, 2022.
Declaration of Marc Juzkow, case Nos. IPR2023-00121 and IPR2023-00122, U.S. Pat. No. 11,258,092, Nov. 2, 2022.
Certified translation of Higuchi CN101286572, Apr. 25, 2022.
Petition for Inter Partes Review; IPR2023-00122, U.S. Pat. No. 11,258,092, Nov. 2, 2022.
Petition for Inter Partes Review; IPR2023-00160, U.S. Pat. No. 11,024,869, Nov. 8, 2022.
Declaration of Marc Juzkow, case Nos. IPR2023-00160 and IPR2023-00161, U.S. Pat. No. 11,024,869, Nov. 7, 2022.
Petition for Inter Partes Review; IPR2023-00161, U.S. Pat. No. 11,024,869, Nov. 8, 2022.
IPR2022-10484, U.S. Pat. No. 9,153,835, Patent Owner's Preliminary Response, Dec. 15, 2022.
IPR2022-01484, U.S. Pat. No. 9,153,835, Petitioner Reply to Patent Owner Preliminary Response, Jan. 12, 2023.
IPR2022-01484, U.S. Pat. No. 9,153,835, Patent Owner's Sur-Reply to its Preliminary Response, Jan. 20, 2023.
IPR2022-10487, U.S. Pat. No. 9,799,913, Patent Owner's Preliminary Response, Dec. 15, 2022.
IPR2022-10487, U.S. Pat. No. 9,799,913, Petitioner Reply to Patent Owner Preliminary Response, Jan. 12, 2023.

(56) References Cited

OTHER PUBLICATIONS

IPR2022-10487, U.S. Pat. No. 9,799,913, Patent Owner's Sur-Reply to its Preliminary Response, Jan. 20, 2023.
IPR2022-10486, U.S. Pat. No. 9,496,581, Patent Owner's Preliminary Response, Dec. 15, 2022.
IPR2022-10486, U.S. Pat. No. 9,496,581, Petitioner Reply to Patent Owner Preliminary Response, Jan. 12, 2023.
IPR2022-10486, U.S. Pat. No. 9,496,581, Patent Owner's Sur-Reply to its Preliminary Response, Jan. 20, 2023.
IPR2022-10473, U.S. Pat. No. 11,024,904, Patent Owner's Preliminary Response, Jan. 13, 2023.
IPR2022-10473, U.S. Pat. No. 11,024,904, Petitioner Reply to Patent Owner Preliminary Response, Feb. 8, 2023
IPR2022-10474, U.S. Pat. No. 11,024,905, Patent Owner's Preliminary Response, Dec. 15, 2022.
IPR2022-10474, U.S. Pat. No. 11,024,905, Petitioner Reply to Patent Owner Preliminary Response, Jan. 18, 2023.
IPR2022-10474, U.S. Pat. No. 11,024,905, Patent Owner's Sur-Reply to its Preliminary Response, Jan. 25, 2023.
IPR2022-10476, U.S. Pat. No. 11,024,905, Patent Owner's Preliminary Response, Dec. 15, 2022.
IPR2022-10476, U.S. Pat. No. 11,024,905, Petitioner Reply to Patent Owner Preliminary Response, Jan. 18, 2023.
IPR2022-10476, U.S. Pat. No. 11,024,905, Patent Owner's Sur-Reply to its Preliminary Response, Jan. 25, 2023.
IPR2022-10477, U.S. Pat. No. 11,024,907, Patent Owner's Preliminary Response, Jan. 13, 2023.
IPR2022-10477, U.S. Pat. No. 11,024,907, Petitioner Reply to Patent Owner Preliminary Response, Feb. 8, 2023.
IPR2022-10478, U.S. Pat. No. 11,024,907, Patent Owner's Preliminary Response, Jan. 13, 2023.
IPR2022-10478, U.S. Pat. No. 11,024,907, Petitioner Reply to Patent Owner Preliminary Response, Feb. 8, 2023.
IPR2023-00122, U.S. Pat. No. 11,258,092, Patent Owner's Preliminary Response, Feb. 16, 2023.
IPR2023-00121, U.S. Pat. No. 11,258,092, Patent Owner's Preliminary Response, Feb. 16, 2023.
IPR2023-00160, U.S. Pat. No. 11,024,869, Patent Owner's Preliminary Response, Feb. 16, 2023.
IPR2023-00161, U.S. Pat. No. 11,024,869, Patent Owner's Preliminary Response, Feb. 16, 2023.
IPR2023-10473, U.S. Pat. No. 11,024,904, Patent Owner's Sur-Reply to its Preliminary Response, Feb. 15, 2023.
IPR2022-10477, U.S. Pat. No. 11,024,907, Patent Owner's Sur-Reply to its Preliminary Response, Feb. 15, 2023.
IPR2022-10478, U.S. Pat. No. 11,024,907, Patent Owner's Sur-Reply to its Preliminary Response, Feb. 15, 2023.
IPR2022-10474, U.S. Pat. No. 11,024,905, Decision Denying Institution of Inter Partes Review, Mar. 14, 2023.
IPR2022-10476, U.S. Pat. No. 11,024,905, Decision Granting Institution of Inter Partes Review, Mar. 14, 2023.
IPR2022-01484, U.S. Pat. No. 9,153,835, Decision Denying Institution of Inter Partes Review, Mar. 14, 2023.
IPR2022-10486, U.S. Pat. No. 9,496,581, Decision Denying Institution of Inter Partes Review, Mar. 14, 2023.
IPR2022-10487, U.S. Pat. No. 9,799,913, Decision Denying Institution of Inter Partes Review, Mar. 14, 2023.
IPR2023-00121, U.S. Pat. No. 11,258,092, Patent Owner's Sur-Reply to its Preliminary Reponse, Mar. 22, 2023.
IPR2023-00122, U.S. Pat. No. 11,258,092, Patent Owner's Sur-Reply to its Preliminary Response, with Exhibits, Mar. 22, 2023.
IPR2023-00160, U.S. Pat. No. 11,024,869, Patent Owner's Sur-Reply to its Preliminary Response, Mar. 22, 2023.
IPR2023-00161, U.S. Pat. No. 11,024,869, Patent Owner's Sur-Reply to its Preliminary Response, with Exhibit, Mar. 22, 2023.
IPR2022-10473, U.S. Pat. No. 11,024,904, Decision Granting Institution of Inter Partes Review, Apr. 11, 2023.
IPR2022-10477, U.S. Pat. No. 11,024,907, Decision Denying Institution of Inter Partes Review, Apr. 11, 2023.
IPR2022-10478, U.S. Pat. No. 11,024,907, Decision Granting Institution of Inter Partes Review, Apr. 11, 2023.
IPR2023-00122, U.S. Pat. No. 11,258,092, Decision Denying Institution of Inter Partes Review, May 12, 2023.
IPR2023-00121, U.S. Pat. No. 11,258,092, Decision Granting Institution of Inter Partes Review, May 12, 2023.
IPR2023-00160, U.S. Pat. No. 11,024,869, Decision Granting Institution of Inter Partes Review, May 12, 2023.
IPR2023-00161, U.S. Pat. No. 11,024,869, Decision Denying Institution of Inter Partes Review, May 12, 2023.
IPR2022-01476, U.S. Pat. No. 11,024,905, Patent Owner's Response, Jun. 6, 2023.
Declaration of Dr. Quinn Horn (parts 1 and 2), IPR2022-01476, U.S. Pat. No. 11,024,905.
IPR2022-10478, U.S. Pat. No. 11,024,907, Patent Owner's Response, Jul. 5, 2023.
IPR2022-10473, U.S. Pat. No. 11,024,904, Patent Owner's Response, Jul. 5, 2023.
Declaration of Dr. Quinn Horn, IPR2022-01478, U.S. Pat. No. 11,024,907, Jul. 5, 2023.
Declaration of Dr. Quinn Horn (parts 1 and 2), IPR2022-01473, U.S. Pat. No. 11,024,904, Jul. 5, 2023.

\* cited by examiner

BUTTON CELLS AND METHOD OF PRODUCING SAME

CROSS-REFERENCE TO PRIOR APPLICATIONS

This is a divisional of U.S. Ser. No. 15/696,354, filed Sep. 6, 2017, which is a divisional of U.S. Ser. No. 15/283,568, filed Oct. 3, 2016, which is a continuation of U.S. Ser. No. 14/827,387, filed Aug. 17, 2015, which is a divisional of U.S. Ser. No. 13/146,669, filed Sep. 7, 2011, which is a § 371 of International Application No. PCT/EP2010/000787, with an international filing date of Feb. 9, 2010 (WO 2010/089152 A1, published Aug. 12, 2010), which claims priority to German Patent Application Nos. 10 2009 008 859.8, filed Feb. 9, 2009, 10 2009 030 359.6, filed Jun. 18, 2009, and 10 2009 060 788.9, filed Dec. 22, 2009, all of which above applications are hereby incorporated by reference herein.

FIELD

This disclosure relates to button cells comprising two metallic housing half-parts separated from one another by an electrically insulating seal and which form a housing with a flat bottom area and a flat top area parallel to it, as well as within the housing, an electrode-separator assembly comprising at least one positive and at least one negative electrode, which are in the form of flat layers and are connected to one another by at least one flat separator, and to a method of producing such button cells.

BACKGROUND

Button cells normally have a housing consisting of two housing half-parts, a cell cup and a cell top. By way of example, these may be produced from nickel-plated deep-drawn metal sheet as stamped and drawn parts. The cell cup normally has positive polarity, and the housing top negative polarity. The housing may contain widely differing electrochemical systems, for example, zinc/$MnO_2$, primary and secondary lithium systems, or secondary systems such as nickel/cadmium or nickel/metal hydride.

By way of example, rechargeable button cells based on nickel/metal hydride or lithium-ion systems are in widespread use. In the case of lithium-ion button cells, the electrochemically active materials are normally not arranged within the button cell housing in the form of individual electrodes, in the form of tablets, separated from one another by a separator. Instead, prefabricated electrode-separator assemblies are preferably inserted flat into the housing. In that case, a porous plastic film is preferably used as a separator, onto which the electrodes are laminated or adhesively bonded flat. The entire assembly comprising the separator and the electrodes generally have a maximum thickness of a few hundred μm. To allow button cell housings of normal dimensions to be filled, a plurality of such assemblies are therefore frequently placed flat one on top of the other. This allows stacks of any desired height, in principle, to be produced, in each case matched to the available dimensions of the button cell housing into which the stack is intended to be installed. This ensures optimum utilization of the available area within the housing.

By virtue of the design, however, various problems also occur in the case of button cells which contain such stacks of electrode-separator assemblies. On the one hand, it is necessary, of course, for the electrodes of the same polarity each to be connected to one another within the stack, and then each to make contact with the corresponding pole of the button cell housing. The required electrical contacts result in material costs, and the space occupied by them is, furthermore, no longer available for active material. In addition, the production of the electrode stacks is complicated and expensive since faults can easily occur when the assemblies make contact with one another, increasing the scrap rate. On the other hand, it has been found that button cells having a stack of electrodes and separators very quickly start to leak.

Traditionally, button cells have been closed in a liquid-tight manner by beading the edge of the cell cup over the edge of the cell top in conjunction with a plastic ring, which is arranged between the cell cup and the cell top and at the same time acts as a sealing element and for electrical insulation of the cell cup and of the cell top. Button cells such as these are described, for example, in DE 31 13 309.

However, alternatively, it is also possible to manufacture button cells in which the cell cup and the cell top are held together in the axial direction exclusively by a force-fitting connection, and which do not have a beaded-over cup edge. Button cells such as these and methods for their production are described in German Patent Application 10 2009 017 514. Irrespective of the various advantages which button cells such as these without beading may have, they can, however, not be loaded as heavily in the axial direction as comparable button cells with a beaded-over cup edge, in particular with respect to axial mechanical loads which are caused in the interior of the button cell. For example, the electrodes of rechargeable lithium-ion systems are continually subject to volume changes during charging and discharging processes. The axial forces which occur in this case can, of course, lead to leaks more readily in the case of button cells without beading than in the case of button cells with beading.

It could therefore be helpful to provide a button cell in which the problems mentioned above do not occur, or occur only to a greatly reduced extent. In particular, it could be helpful to provide a button cell that is resistant to mechanical loads which occur in the axial direction than conventional button cells, in particular even when they are manufactured as button cells without a beaded-over cup edge.

SUMMARY

The present invention provides a method for producing a button cell, including: providing a cell cup, the cell cup having a flat bottom area, a cell cup casing, and a bottom edge forming a transition between the flat bottom area and the cell cup casing; providing a cell top, the cell top having a flat top area, a cell top casing having a first height, and a top edge forming a transition between the flat top area and the cell top casing, wherein at least a portion of the cell top casing is cylindrical; providing an electrode-separator assembly winding, the electrode-separator assembly winding having a positive electrode and a negative electrode in the form of layers connected to one another by a separator layer and wound up in a spiral shape about an axis, wherein a first of the positive electrode and the negative electrode is formed from a first metallic film or metallic mesh covered with an electrode material, the first metallic film or metallic mesh including an uncovered end piece; applying an electrically insulating seal at least to an outer portion of the cell top casing; inserting the electrode-separator assembly winding into the cell top; inserting the cell top into the cell cup to form a housing, wherein: the flat top area is parallel to the flat bottom area, the axis of the electrode-separator assembly winding is aligned at right angles to both the flat top area and the flat bottom area, the first metallic film or metallic mesh is bent such that at least a portion of the uncovered end piece extends out of the electrode-separator assembly winding and at least partially lies flat between an end face of the electrode-separator assembly winding and one of the flat bottom area or the flat top area, and the cell top casing and the cell cup casing form an overlap area extending in a direction parallel to the axis of the electrode-separator assembly winding and having a second height, the second height being between 20% and 99% of the first height; and applying, in a radial direction perpendicular to the axis of the electrode-separator assembly winding, a pressure on the cell cup casing so as to seal the housing, wherein the portion of the cell top casing that is cylindrical forms at least a part of the overlap area.

DETAILED DESCRIPTION

Figure 1:
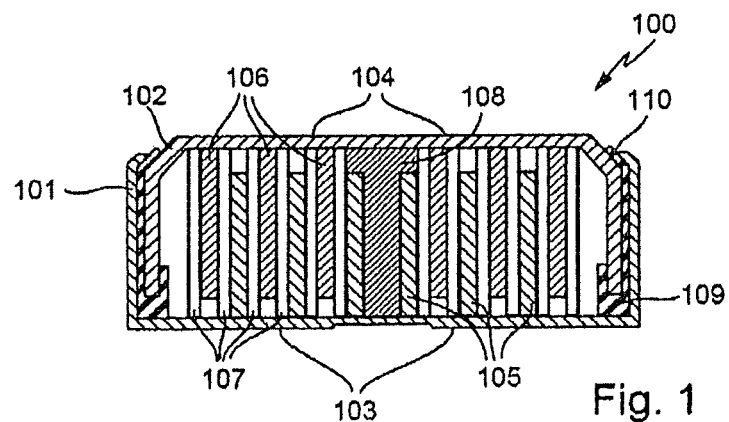
FIG. 1 schematically illustrates the cross section through one preferred example of a button cell.

In an embodiment, our button cell comprises two metallic housing half-parts separated from one another by an electrically insulating seal and form a housing with a flat bottom area and a flat top area parallel to it. As already mentioned initially, the two housing half-parts are generally a so-called "housing cup" and a "housing top." In particular, parts composed of nickel-plated steel or metal sheet are preferred as housing half-parts. Furthermore, trimetals, for example, with the sequence of nickel, steel (or stainless steel) and copper (with the nickel layer preferably forming the outer layer and the copper layer preferably forming the inside of the button cell housing) are particularly suitable for use as the metallic material.

By way of example, an injection-molded or film seal can be used as a seal. The latter are described, for example, in DE 196 47 593.

Within the housing, a button cell comprises an electric-separator assembly with at least one positive and at least one negative electrode. These are each in the form of flat electrode layers. The electrodes are connected to one another via a flat separator. The electrodes are preferably laminated or adhesively bonded onto this separator. The electrodes and the separator generally each have thicknesses only in the μm range. In general, a porous plastic film is used as the separator.

In contrast to the button cells mentioned above, our button cell is distinguished in particular by the electrode layers having a very particular orientation, specifically being aligned essentially at right angles to the flat bottom and top areas. While known button cells with stacked electrode-separator assemblies always contain these assemblies inserted flat such that the electrode layers are aligned essentially parallel to the flat bottom and top areas, the situation in our button cell is the opposite of this.

The right-angled alignment of the electrode layers has an unexpectedly considerable advantage, specifically because it has been found that this alignment results in a considerable improvement in the sealing characteristics of our button cell, particularly for button cells based on lithium-ion systems. The electrodes of rechargeable lithium-ion systems are continually subject to volume changes during charging and discharging processes. Volume changes such as these also occur, of course, in the electrodes of our button cell. However, the mechanical forces created during this process no longer act primarily axially, as in the case of a stack of electrode-separator assemblies which are inserted flat. Because of the right-angled alignment of the electrodes, they in fact act radially. Radial forces can be absorbed very much better than axial forces by the housing of a button cell. The improved sealing characteristics are presumably a result of this.

Particularly preferably, the electrodes and the flat separator of our button cell are each in the form of strips or ribbons. By way of example, the production of our button cell can be based on a separator material in the form of an endless ribbon, onto which the electrodes are applied, in particular laminated, once again in particular in the form of strips or at least rectangles.

In the housing of our button cell, this assembly is particularly preferably in the form of a winding, in particular in the form of a spiral winding. Windings such as these can be produced very easily using known methods (see, for example, DE 36 38 793), by applying the electrodes flat, in particular in the form of strips, to a separator which is in the form of an endless ribbon, in particular by laminating them on. In this case, the assembly comprising electrodes and separators is generally wound onto a so-called "winding mandrel." Once the winding has been removed from the winding mandrel an axial cavity remains in the center of the winding. This allows the winding to expand into this cavity, if necessary. However, in some circumstances, this can lead to problems in making electrical contact between the electrodes and the metallic housing half-parts, and this will be described in more detail in the following text.

The electrode winding is preferably arranged within a button cell (so that the electrode layers of the winding are aligned at right angles to the flat bottom area and top area of the housing) such that the end faces of the winding face in the direction of the flat bottom area and of the flat top area.

Preferably, our button cells have a fixed winding core in the center of the winding, which at least partially fills the axial cavity in the center of the winding. A winding core such as this fixes the electrode winding in the radial direction and prevents possible implosion of the winding into the axial cavity. When the winding expands in this way, this also results in the reduction in the pressure which the end faces of the winding exert in the axial direction, and therefore in the direction of output conductors which may be arranged there (this is described in more detail further below). If this is prevented, then there are generally also no problems with making electrical contact between the electrodes and the metallic housing half-parts.

In addition, a winding core such as this also makes the button cell more robust against external mechanical influences. In general, it is no longer possible for the electrode winding in the button cell to be damaged by external mechanical pressure in the axial direction.

Preferably, the electrode winding is a spiral electrode winding, the axial cavity which has been mentioned in the center of the winding is preferably essentially cylindrical (in particular circular-cylindrical). On the casing side, it is bounded by the winding, and at the end it is bounded by corresponding surfaces of the bottom area and of the top area of the button cell housing.

Correspondingly, the winding core which is contained in our button cell is preferably also in the form of a cylinder, in particular a hollow cylinder. The height of a cylinder such as this preferably corresponds to the respective distance between the flat bottom area and the flat top area, which is parallel to it.

Particularly preferably, the winding core may have radially self-expanding characteristics. For example, it is possible for the winding core to be inserted in a radially compressed configuration into the axial cavity in the winding of a button cell. When the radially compressed winding core expands, it exerts a radial pressure on the electrode winding surrounding it, thus ensuring a contact pressure in the axial direction as well.

By way of example, an axially slotted hollow cylinder may be used as a radially self-expanding winding core. However, alternatively, it is also conceivable to use other radially self-expanding materials, for example, based on plastic.

Particularly preferably, the winding core is composed of a metal such as stainless steel or plastic.

Particularly preferably, the assembly comprising electrodes and a separator in our button cell has one of the following layer sequences:

negative electrode/separator/positive electrode/separator
or
positive electrode/separator/negative electrode/separator.

Assemblies such as these can be produced and wound very easily without short circuits occurring between electrodes of opposite polarity.

The separators which can be used in our button cell are preferably films composed of at least one plastic, in particular of at least one polyolefin. By way of example, the at least one polyolefin may be polyethylene. However, it is also possible to use multilayer separators, for example, separators composed of a sequence of different polyolefin layers, for example, with the sequence polyethylene/polypropylene/polyethylene.

It is not essential to use a plurality of separate separators to produce assemblies with the abovementioned sequence. In fact, a separator can also be looped around the end of one of the electrodes, thus resulting in both sides of this electrode being covered by the separator.

The separators which can preferably be used in our button cell preferably have a thickness of 3 μm to 100 μm, in particular of 10 μm to 50 μm.

The electrodes preferably have a thickness of 10 μm to 1000 μm, in particular of 30 μm to 500 μm.

Preferably, the negative electrode and the positive electrode in the electrode-separator assembly are arranged offset with respect to one another within the assembly. In this case, an offset arrangement is intended to mean that the electrodes are arranged such that this results in a respectively different separation between the electrodes and the flat bottom and top areas in the button cell. In the simplest case, for example, a positive and a negative electrode can be slightly offset as strips of the same width applied to the opposite sides of a separator ribbon, as a result of which the distance between the positive electrode and the upper separator edge is greater than the comparable distance measured from the negative electrode. This then applies in the opposite sense, of course, to the distance from the lower separator edge.

Particularly preferably, preferably as a result of this offset arrangement, the positive electrode, in particular an edge of the positive electrode, rests directly on the cup part, in particular in the flat bottom area of the cup part, while the negative electrode, in particular an edge of the negative electrode, rests directly on the top part, in particular in the flat top area of the top part. In this example, a direct electrical and mechanical contact is made between the electrodes and the cup and top parts. The offset arrangement of the electrodes with respect to one another therefore makes it possible for the electrodes to make contact with the respective housing parts, without any need to use additional electrical contacts and connecting means.

However, alternatively, it is also preferable for at least one of the electrodes, preferably both the at least one negative electrode and the at least one positive electrode in our button cell, to be connected to the flat bottom and top areas via one or more output conductors. By way of example, the output conductors may be output-conductor lugs composed of copper or some other suitable metal. On the electrode side, the output conductors may, for example, be connected to a current collector. The output conductors can be connected to the housing and/or to the current collectors by, for example, welding or via an clamped joint.

In the simplest case, the current collectors of the positive and negative electrodes can also themselves act as output conductors. Collectors such as these are generally metallic films or meshes which are embedded in the respective electrode material. Uncovered subareas, in particular end pieces, of collectors such as these can be bent around and can be brought into contact with the button cell housing.

The use of output conductors may be particularly advantageous if the negative electrode and the positive electrode within the assembly are arranged with respect to one another such that this results in the electrodes each being at the same distance from the flat bottom and top areas. Or, in other words, if the electrodes are not arranged offset with respect to one another within the electrode-separator assembly, as has been described above.

However, if the distance between electrodes of opposite polarity and the flat bottom and top areas is the same, this results in the risk of a positive and a negative electrode touching the metallic cup or top part at the same time, thus resulting in a short circuit. Preferably, the button cell may therefore comprise at least one insulating means, which prevents a direct mechanical and electrical contact between the end faces of the winding and the flat bottom and top areas.

It is preferable for the electrodes in our button cell such as this to be connected via the already mentioned separate output conductors to the flat bottom and top areas. These ensure the electrical contact between the electrodes and the housing.

In this case, it is preferable for at least a subsection of the output conductor or conductors in the bottom area and in the top area of the housing to rest flat on the inside of the housing half-parts. Ideally, the output conductors naturally make electrical contact with the insides of the housing when they are at least slightly pressed against the housing (if they are not welded to it in any case). This can be achieved surprisingly efficiently by a suitable arrangement of the winding core that has been mentioned, in our button cell.

By way of example, the insulating means may be a flat layer composed of plastic, for example, a plastic film, which is arranged between the end faces of the winding and the flat bottom and top areas of the housing of our button cell.

Corresponding to the above statements, the button cell is, in particular, a rechargeable button cell. Our button cell particularly preferably has at least one lithium-intercalating electrode.

The ratio of the height to the diameter of button cells is, by definition, less than 1. For our button cell, this ratio is particularly preferably 0.1 to 0.9, in particular 0.15 to 0.7. In this case, the height means the distance between the flat bottom area and the flat top area parallel to it. The diameter means the maximum distance between two points on the casing area of the button cell.

The button cell is particularly preferably a button cell which is not beaded over, as is described in DE 10 2009 017 514.8, mentioned above. Correspondingly, there is preferably an exclusively force-fitting connection between the housing half-parts. Therefore, our button cell does not have a beaded-over cup edge, as is always the case with known button cells. The button cell is closed without being beaded over.

Button cells such as these which are not beaded over generally make use of conventional cell cups and cell tops, which each have a bottom area and a top area, a casing area, an edge area which is arranged between the bottom and top areas and the casing area, and a cut edge. Together, the cell cup and cell top form a housing, which forms a receptacle for the conventional internal components of a button cell such as electrodes, separator and the like. As in the normal way, the bottom area of the cell cup and the top area of the cell top are aligned essentially parallel to one another in this housing. The casing areas of the cell cup and cell top in the finished button cell are aligned essentially at right angles to the bottom and top areas, and preferably have an essentially cylindrical geometry. The internal and external radii of the cell cup and cell top are preferably essentially constant in the casing areas. The edge areas, which have been mentioned, of the cell cup and cell top form the transition between the casing areas and the top and bottom areas. They are preferably therefore bounded on the one hand by essentially flat bottom and top areas, and on the other hand by the essentially cylindrical casing areas, which are arranged at right angles to them. By way of example, the edge areas may be in the form of a sharp edge, or else may be rounded.

The procedure for producing a button cell which is not beaded over is generally to first of all apply a seal to the casing area of a cell top. In a further step, the cell top is then inserted, with the seal fitted, into a cell cup thus resulting in an area in which the casing areas of the cell cup and cell top overlap. The size of the overlap area and the ratio of the overlapping area to the non-overlapping areas are in this case governed by the respective height of the casing areas of the cell cup and cell top, and by the depth of the insertion. With regard to the casing area of the cell top, it is preferable for between 20% and 99%, in particular between 30% and 99%, particularly preferably between 50% and 99%, to overlap the casing area of the cell cup (the percentages each relate to the height of the casing or of the casing area). Before being inserted into the housing cup and/or the housing top, the other conventional components of a button cell (electrodes, separator, electrolyte and the like) are inserted. After the cell top has been inserted completely into the cell cup a pressure is exerted on the casing area of the cell cup, in particular in the area of the cut edge, to seal the housing. In this case, a joined-together housing part should as far as possible not be subjected to any loads, or only to very small loads, in the axial direction. Therefore, the pressure is applied in particular radially. Apart from the sealing of the housing which has already been mentioned the external diameter of the cell housing can therefore also be calibrated.

It is particularly important for the heights of the casing areas of the cell cup and cell top to be matched to one another such that the cut edge of the cell cup is pressed against the casing area of the cell top by the pressure on the casing area of the cell cup. The heights of the casing areas are therefore preferably chosen such that it is impossible to bend the cut edge of the cell cup around inward over the edge area of the cell top which has been completely inserted into the cell cup. Correspondingly, the edge of the cell cup is not beaded over the edge area of the cell top. In consequence, the cell cup of a button cell manufactured using our method has a casing area with an essentially constant radius in the direction of the cut edge.

In the case of button cells produced using a method such as this, there is preferably an exclusively force-fitting connection between the housing components comprising the cell cup, the cell top and the seal. This ensures that the components are therefore held together in a preferred manner, essentially only by static-friction force.

Button cells without any beading over are particularly preferably produced using a cell cup which is conical at least in one subarea of its casing, such that at least its internal diameter increases in the direction of the cut edge. This makes it considerably easier to insert the cell top into the cell cup. The dimensions of the cell cup and cell top are preferably matched to one another such that relatively large opposing forces preferably do not occur until the top has been inserted virtually completely into the cup. The cone angle in this case is preferably 10 minutes to 3°, in particular 30 minutes to 1° 30 minutes.

The cell top, which is inserted into the cell cup with the applied seal, is preferably cylindrical, at least in a part of the casing area. This may relate in particular to that part of the casing area which overlaps the conical subarea of the cell cup casing that has been mentioned, after the cell top has been inserted into the cell cup. The casing of the cell top, and therefore also the casing area, is particularly preferably entirely cylindrical. The cell top therefore preferably has a constant external radius in the casing area. This may relate in particular to that part which overlaps the conical part of the casing area of the cell cup after the cell top has been inserted.

When a cell top with a cylindrical casing area is being inserted into a cell cup which is conical at least in one subarea of its casing, as has been described above, a gap which is open at the top is generally created between the cell cup and the cell top. This gap is generally closed again by the pressure on the casing area of the cell cup. Thus, the pressure on the casing area of the cell cup may be chosen such that the conical part of the casing area of the cell cup is pushed inward until the inside of the cell cup and the outside of the cell top are essentially at the same distance from one another in the overlapping area. The resultant button cell has casing areas which are aligned parallel to one another, in particular in the overlapping area.

One important aspect in this case is the choice of the seal which connects the cell cup to the cell top. The seal is preferably a plastic seal which connects the cell cup to the cell top. The seal is preferably a plastic seal composed of a thermoplastic.

The plastic seal is particularly preferably a film seal, for example, as is described in already cited DE 196 47 593, in particular a film seal composed of a thermoplastic.

Film seals can be produced with a very uniform thickness. When a suitable pressure is applied to the casing area of the cell cup, this results in an interference fit, as a consequence of which the button cell that has been produced has highly excellent sealing characteristics. The use of film seals makes it possible to dispense with the edge of the cell cup being beaded over without this on the other hand resulting in a need to accept disadvantages in other important characteristics.

It is very particularly preferable to use plastic seals, in particular plastic films, based on polyamide or based on polyether ether ketones in the present case.

It is preferable for the seal for a cell which is not beaded over to have an initial thickness in the range of 50 µm to 250 µm, particularly preferably 70 µm to 150 µm, in particular about 100 µm. The term "initial thickness" is in this case intended to mean the thickness of the seal before it is applied to the casing of the cell top. In contrast to this, the term "final thickness" is intended to mean the thickness of the seal in the finished cell. It is clear that, at least in the overlapping area, this generally corresponds to the distance between the inside of the cell cup and the outside of the cell top.

To allow a sufficiently large amount of friction to be produced between the cell cup and the cell top, both the external and internal radii of the cup and top should be matched to one another and to the thickness of the film seal. This is the only way to create a sufficiently high contact pressure to hold the two individual parts together. It is preferable for the parts used in this case for the difference between the external radius of the cell top, which is to be inserted into the cell cup, on the cut edge of the cell top and the smallest internal radius of the cell cup in that part of the casing area which overlaps the casing area of the cell top to be less than the initial thickness of the seal that is used. The difference is particularly preferably 10% to 90% of the initial thickness, in particular 30% to 70%, and very particularly preferably about 50%.

After the cell top has been inserted into the cell cup, a part of the casing area of the cell cup can be drawn radially inward. In particular, this relates to that part of the casing area which does not overlap the casing area of the cell top.

We found that this process of drawing in radially makes it possible to achieve considerably better sealing characteristics. Drawing in the cup casing results in a radial pressure being exerted on the edge section which rests on the inner wall of the housing cup and on the seal arranged between the housing top and the housing cup, with the seal in consequence being compressed in this area.

The drawing-in process can be carried out at the same time as the already mentioned exertion of pressure on the casing area of the cell cup, although the drawing-in process is preferably carried out in a subsequent, separate step.

Our method of producing a button cell can be used in particular to produce button cells as have been described above, that is to say button cells having a housing with a flat bottom area and a flat top area parallel to it. It is suitable for producing not only button cells which are not beaded over, but also for those which are beaded over.

With respect to the preferred examples of the individual components used in our method (housing parts and dimensions, electrodes, separator and the like), reference can therefore be made to the above statements and explanations in their entirety.

In general, the housing is assembled from a metallic cup part (housing cup) and a metallic top part (housing top), with an electrode-separator assembly with electrodes in the form of a flat layer being inserted into the housing such that the electrodes are aligned at right angles to the flat bottom area and top area.

As already mentioned, the electrode-separator assembly is preferably installed in the form of a winding, in particular a spiral winding.

In general, our method always comprises the following steps:
insertion of the winding into the metallic top part, and
insertion of the metallic top part with the winding into a metallic cup part.
The edge of the cup part is then optionally beaded over the edge of the top part.

When a button cell which is not beaded over is produced, the corresponding steps as described above are carried out.

Before the housing is closed, the electrodes are normally also impregnated with electrolyte solution.

For the insertion process, the winding is preferably rolled up on a winding mandrel. After or during the insertion process, the winding mandrel can then be removed. If required, the winding core that has been mentioned above is then inserted. Alternatively, the electrode-separator assembly can also be wound directly onto a core such as this.

The spiral winding is particularly preferably heat-treated on its end faces before being installed. In this case, it is at least briefly subjected to a temperature at which the separator in the winding is thermoplastically deformable. In general, the separator projects somewhat on the end faces of the winding, and this is itself subject to the precondition that the electrodes are arranged with the offset with respect to one another, as described above. The heat treatment allows the separator to be shrunk together somewhat, therefore, if required, even exposing the edge of an adjacent electrode, such that this can rest directly on the button cell housing.

The stated advantages and further advantages will become evident from the description which now follows of the drawings. In this case, individual features may be implemented on their own or in combination with one another. The described examples are intended only for explanation and better understanding, and should in no way be understood as being restrictive.

FIG. 1 schematically illustrates the cross section through one preferred example of a button cell 100. This has a metallic cup part 101 and metallic top part 102. The two parts are connected to one another, sealed by a seal 109. Together, they form a housing with a flat bottom area 103 and a flat top area 104 parallel to it. When in use, these flat areas 103 and 104 form the poles of the button cell, from which current can be drawn by a load. The edge 110 of the cell cup 101 is beaded inward over the edge of the cell top 102.

An arrangement comprising an electrode 105 in the form of a strip, an electrode 106 in the form of a strip, and the separators 107 in the form of strips is arranged in the interior of the electrode. The assembly comprising the electrodes 105 and 106 as well as the separators 107 is in this case in the form of a winding, whose end faces abut against the flat bottom area 103 and the flat top area 104, which is parallel to it. The assembly is wound up on the core 108 in the center of the button cell 100. Both the core 108 as well as the electrodes and separators which are wound around it are aligned at right angles to the flat bottom and top areas 104 and 103. When the volume of the electrodes increases or decreases during a charging or discharging process, the mechanical forces which result in this case act predominantly radially, and can be absorbed by the casing area of the button cell 100.

It should be stressed that the positive electrode 105 and the negative electrode 106 respectively rest directly on the cup part 101 and on the top part 102 of the button cell 100. There is no need for a separate output conductor for connecting the electrodes to the top part 102 and to the cup part 101.

Figure 2:
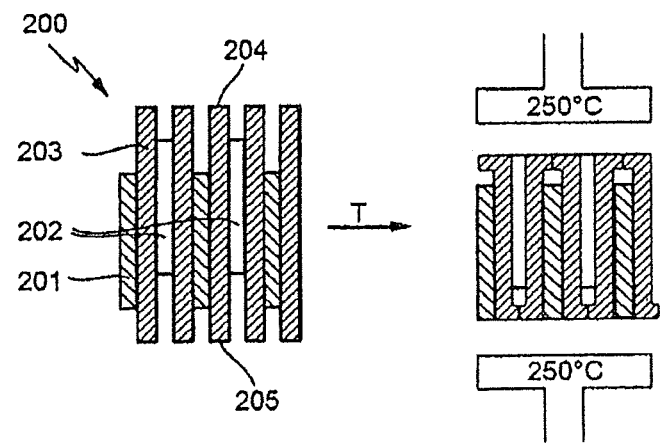
FIG. 2 illustrates the effect of heat treatment of a wound-up electrode-separator assembly, which is used in preferred examples of our method.

FIG. 2 shows the effect of the heat treatment of an electrode-separator winding 200, which is provided in preferred examples of the method of producing a button cell. The illustration schematically shows a winding 200 comprising an assembly of a positive electrode 201 (bar with cross strips), a negative electrode 202 (white bar) and the separators 203 (detail). The positive and the negative electrodes 201 and 202 are in each case arranged offset with respect to one another. The separators 203 are composed of a thermoplastically deformable material.

When the separator edges which are located on the end faces 204 and 205 of the winding 200 are subjected to a high temperature (for example, of 250° C., as illustrated), then these separator edges shrink. The separators are drawn in at least partially between adjacent electrodes. In the process, the edges of the negative electrode 202 are exposed on the end face 204, while the edges of the positive electrode 201 are covered. The edges of the positive electrode 201 on the end face 205 are exposed, while the edges of the negative electrode 202 are covered.

When a winding that has been treated in this way is in use, this ensures that electrodes of the same polarity can each rest directly only on the housing cup or on the housing top. There is no need for separate electrical connections between the electrodes and the housing parts.

Figure 3A:
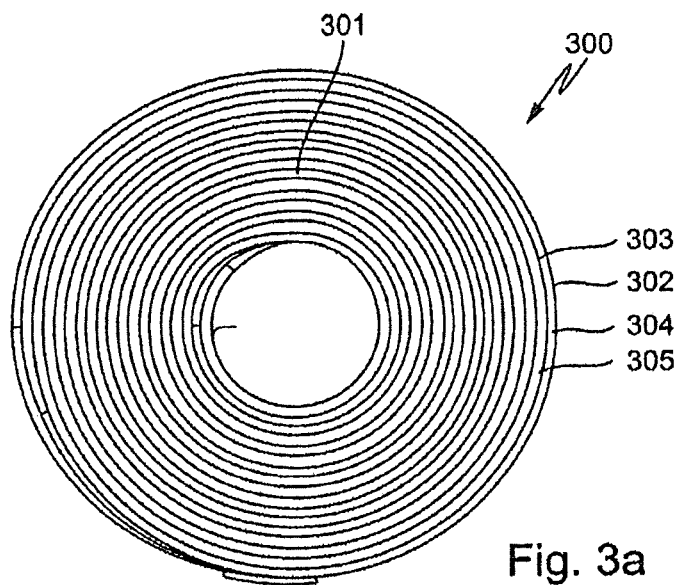
FIGS. 3a and 3b show electrode-separator assemblies in the form of a winding, as can be installed in a button cell.
Figure 3B:
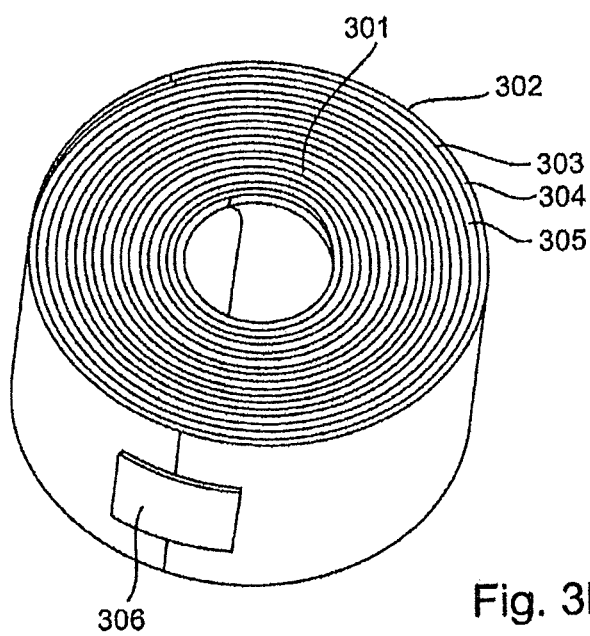

FIG. 3 shows an electrode-separator assembly for button cells in the form of a winding 300, with the illustration A depicting a plan view vertically from above at one of the end faces 301 of the winding 300, while the illustration B shows the winding 300 in a view obliquely from above. In both cases, this shows that the assembly comprises two layers; separators 302 and 303 as well as two electrode layers 304 and 305 (a positive and a negative electrode). The assembly is wound up in a spiral shape and is held together by an adhesive tape 306 on its outside.

Figure 4:
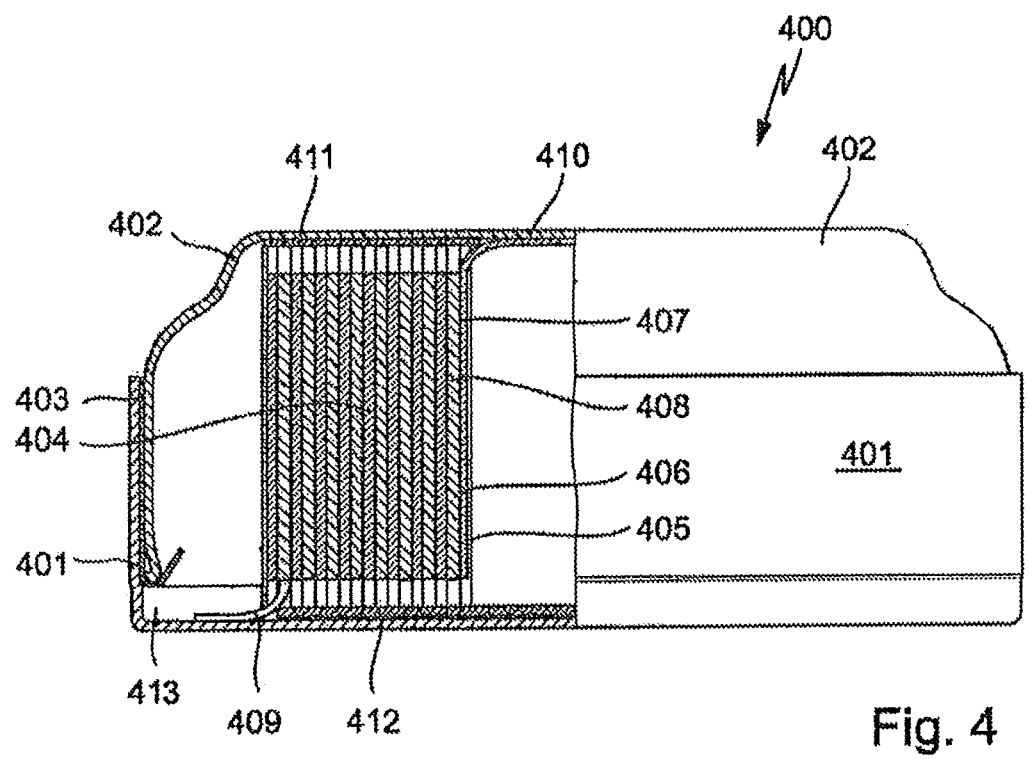
FIG. 4 shows a section illustration of a further preferred example of a button cell.

FIG. 4 shows a sectioned illustration of one preferred example of a button cell 400. The figure shows the housing of the button cell comprising the cup part 401 and the top part 402, between which the seal 403 is arranged. An assembly of electrodes and separators, as is illustrated in FIG. 3, is contained as a spiral winding 404 (illustrated schematically in the cross section) within the housing. The separator layers 405 and 406 as well as the electrodes 407 and 408 of opposite polarity can also be seen well here. In this case, the electrode 407 is connected via the output conductor 410 to the top part 402, while the electrode 408 is connected via the output conductor 409 to the cup part 402. The output conductor 410 is preferably welded to the top part 402. In contrast, the output conductor 409 is connected to the cup part 402 via a clamping connection (it is clamped in between the supporting ring 413, on which the edge of the cell top rests, and the bottom of the cell cup). The insulating means 411 and 412 are arranged between the end faces of the winding and the cup part 401 and the top part 402, and are each in the form of thin plastic disks. This prevents electrodes of opposite polarity from being able to come into contact with the cup part 401 or the top part 402 at the same time. This prevents any short circuit.

Figure 5:
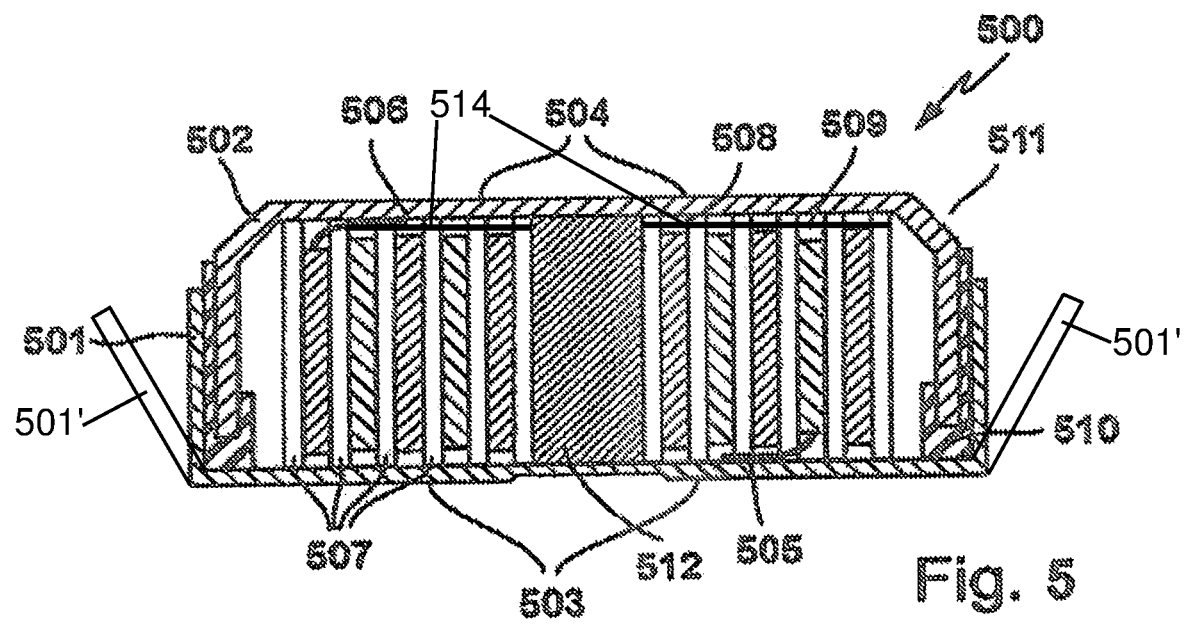
FIG. 5 schematically illustrates the cross section through one preferred example of a button cell in which the edge of the cell cup is not beaded over the edge of the cell cop.

FIG. 5 schematically illustrates the cross section through one preferred example of a button cell 500.

This button cell 500 has a metallic cup part 501 and a metallic top part 502. The two parts are connected to one another, sealed by a seal 510. Together, they form a housing with a flat bottom area 503 and a flat top area 504 parallel to it. When in use, these flat areas 503 and 504 form the poles of the button cell, from which current can be drawn by a load.

The cell top 502 is inserted into the cell cup 501 such that the casing areas of the cell top and of the cell cup overlap. When the cell top 502 is inserted in the cell cup 501, the cell cup has a conical casing area 501', which is subsequently pushed inward, the internal radius of the cell cup 501 in the overlapping area then being essentially constant in the direction of the cut edge. Therefore, the edge of the cell cup 501 is not beaded over the edge 511 of the cell top 502, and the preferred example described above for a button cell 500 is therefore a button cell which is not beaded over.

An assembly comprising an electrode 508 in the form of a strip, an electrode 509 in the form of a strip and separators 507 in the form of strips is arranged in the interior of the electrode. The assembly comprising the electrodes 508 and 509 as well as the separators 507 is in this case in the form of a winding, whose end faces face in the direction of the flat bottom area 503 and of the flat top area 504 which is parallel to it. The assembly is wound up on the winding core 512 in the center of the button cell 500. Both the core 512 and the electrodes and separators which are wound around it are aligned at right angles to the flat bottom and top areas 504 and 503. If the volume of the electrodes increases or decreases during a charging or discharging process, the mechanical forces which result in this case act predominantly radially, and can be absorbed by the casing area of the button cell 500.

The positive and the negative electrodes make contact with the housing half-part comprising the cup and top via the output conductor 505 and the output conductor 506. The output conductor 505 is composed of aluminum, and the output conductor 506 is composed of nickel (or alternatively of copper). Both output conductors are thin films, which rest flat between the end faces of the winding and the flat top and bottom areas 503 and 504. A continuous slight contact pressure is maintained on the output conductors by the winding core 512. The output conductors are preferably separated from the end faces of the winding by a separate insulator arrangement 514 (the separate insulator arrangement separating output conductor 505 from flat bottom area 503 is not illustrated in the drawing), for example, by a thin film.

Figure 6:
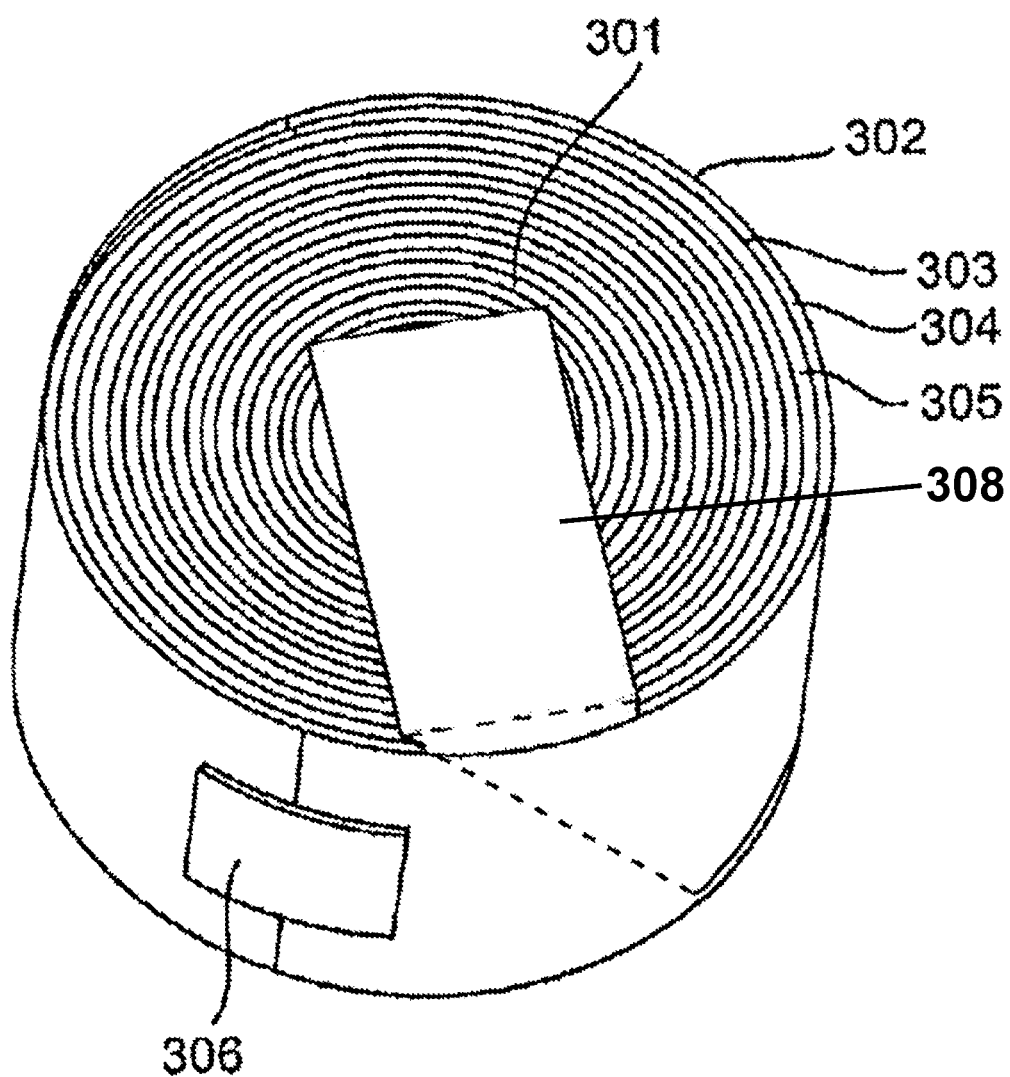
FIG. 6 shows an electrode-separator assembly in the form of a winding, as can be installed in a button cell.

FIG. 6 shows an electrode-separator assembly for button cells in the form of the winding 300. The assembly comprises two layers; separators 302 and 303 as well as two electrode layers 304 and 305 (a positive and a negative electrode). The assembly is wound up in a spiral shape and is held together by an adhesive tape 306 on its outside. In the embodiment depicted in FIG. 6, a first of the electrode layers 304 and 305 is formed from a first metallic film or metallic mesh covered with an electrode material. The first metallic film or metallic mesh includes an uncovered end piece bent such that a portion 308 of the uncovered end piece extends out of the electrode-separator assembly winding and at least partially lies flat on an end face 301 of the electrode-separator assembly winding 300.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for producing a button cell, the method comprising:
    providing a cell cup, the cell cup having a flat bottom area, a cell cup casing, and a bottom edge forming a transition between the flat bottom area and the cell cup casing;
    providing a cell top, the cell top having a flat top area, a cell top casing having a first height, and a top edge forming a transition between the flat top area and the cell top casing, wherein at least a portion of the cell top casing is cylindrical;
    providing an electrode-separator assembly winding, the electrode-separator assembly winding having:
        a positive electrode formed from a first portion of a first metallic film or metallic mesh covered with a first electrode material, and
        a negative electrode formed from a first portion of a second metallic film or metallic mesh covered with a second electrode material,
    wherein:
        the first portion of the first metallic film or metallic mesh covered with the first electrode material and the first portion of the second metallic film or metallic mesh covered with the second electrode material are connected to one another by a separator layer and wound up, along their length, in a spiral shape about an axis, and
        a respective metallic film or metallic mesh includes a second portion, the second portion being a length of the respective metallic film or metallic mesh that is not covered with the electrode material and that serves as an output conductor, the respective metallic film or metallic mesh being the first metallic film or metallic mesh or the second metallic film or metallic mesh;
    applying an electrically insulating seal at least to an outer portion of the cell top casing;
    inserting the electrode-separator assembly winding into the cell top;
    inserting the cell top into the cell cup to form a housing, wherein:
        the flat top area is parallel to the flat bottom area,
        the axis of the electrode-separator assembly winding is aligned at right angles to both the flat top area and the flat bottom area,
        the respective metallic film or metallic mesh is bent such that the second portion of the respective metallic film or metallic mesh at least partially lies flat between an end face of the electrode-separator assembly winding and one of the flat bottom area or the flat top area, and
        the cell top casing and the cell cup casing form an overlap area extending in a direction parallel to the axis of the electrode-separator assembly winding and having a second height, the second height being between 20% and 99% of the first height; and
    applying, in a radial direction perpendicular to the axis of the electrode-separator assembly winding, a pressure on the cell cup casing so as to seal the housing,
    wherein the portion of the cell top casing that is cylindrical forms at least a part of the overlap area.

2. The method of claim 1, wherein the portion of the cell top casing that is cylindrical extends through the entire overlap area in the direction parallel to the axis of the electrode-separator assembly winding.

3. The method of claim 1, wherein the cell top has a constant external radius in an area of the cell top casing such that the entirety of the cell top casing is cylindrical.

4. The method of claim 1, wherein the cell cup casing has, at an end opposite the bottom edge, a cut edge, and
    wherein the cell cup casing has a third height, the third height being less than the first height such that, when the cell top is inserted into the cell cup to form the housing, it is impossible to bend the cut edge of the cell cup casing over the top edge of the cell top.

5. The method of claim 1, wherein the cell cup casing has a conical subarea such that an internal diameter of the cell cup casing increases in a direction extending away from the flat bottom area,
    wherein the conical subarea of the cell cup casing facilitates the inserting the cell top into the cell cup.

6. The method of claim 5, wherein the inserting the cell top into the cell cup creates a gap between the cell cup casing and the cell top casing, the gap being adjacent to the conical subarea of the cell cup casing, and
    wherein the applying, in the radial direction, the pressure on the cell cup casing causes a reduction in a width of the gap.

7. The method of claim 6, wherein the cell cup casing has, at an end opposite the bottom edge, a cut edge, and wherein applying, in the radial direction, the pressure on the cell cup casing so as to cause a reduction in the width of the gap comprises applying the pressure in the radial direction to the cut edge of the cell cup casing.

8. The method of claim 6, wherein the applying, in the radial direction the pressure on the cell cup casing provides an interference fit between the cell top and the cell cup.

9. The method of claim 5, wherein the applying the electrically insulating seal at least to the outer portion of the cell top casing includes applying a first portion of the electrically insulating seal to the portion of the cell top casing that is cylindrical and forms at least the part of the overlap area,
    wherein the first portion of the electrically insulating seal has an initial thickness prior to being applied to the portion of the cell top casing that is cylindrical and forms at least the part of the overlap area, and wherein the portion of the cell top casing that is cylindrical and forms at least the part of the overlap area has an external radius, wherein the cell cup casing has, in the overlap area, a smallest overlap internal radius, and wherein a difference between the external radius and the smallest overlap internal radius is 10% to 90% of the initial thickness.

10. The method of claim 9, wherein the difference between the external radius and the smallest overlap internal radius is 30% to 70% of the initial thickness.

11. The method of claim 9, wherein the initial thickness is in the range of 50 μm to 250 μm.

12. The method of claim 1, wherein the applying an electrically insulating seal at least to an outer portion of the cell top casing includes applying a first portion of the electrically insulating seal to the portion of the cell top casing that is cylindrical and forms at least the part of the overlap area, wherein the first portion of the electrically insulating seal has an initial thickness prior to being applied to the portion of the cell top casing that is cylindrical and forms at least the part of the overlap area, and wherein following the applying, in the radial direction, the pressure on the cell cup casing so as to seal the housing formed by the cell cup and the cell top, the first portion of the electrically insulating seal has a final thickness that is less than the initial thickness thereby providing friction between the cell cup and the cell top so as to hold the cell cup and the cell top together.

13. The method of claim 1, further comprising drawing a part of the cell cup casing radially inward.

14. The method of claim 1, wherein simultaneously to the applying, in a radial direction perpendicular to the axis of the electrode-separator assembly winding, the pressure on the cell cup casing so as to seal the housing, a part of the cell cup casing is drawn radially inward.

15. The method of claim 1, wherein the first electrode material is a lithium-intercalating electrode material.

16. The method of claim 1, further comprising:
welding second portion of the respective metallic film or metallic mesh to the flat bottom area or the flat top area.

17. The method of claim 1, wherein a second respective metallic film or metallic mesh includes a second portion, the second portion being a length of the second respective metallic film or metallic mesh that is not covered with the second electrode material and that serves as a second output conductor, the second respective metallic film or metallic mesh being the other of the first metallic film or metallic mesh and the second metallic film or metallic mesh, the method further comprising:

bending the second respective metallic film or metallic mesh such that the second portion of the second respective metallic film or metallic mesh extends out of the electrode-separator assembly winding and at least partially lies flat between a second end face of the electrode-separator assembly winding and another of the flat bottom area or the flat top area.

18. The method of claim 17, further comprising:
welding the second portion of the respective metallic film or metallic mesh to the flat bottom area or the flat top area, and
welding the second portion of the second respective metallic film or metallic mesh to the other of the flat bottom area and the flat top area.

19. The method of claim 1, further comprising providing an insulator between fi) the end face of the electrode separator assembly winding and (ii) at least part of the second portion of the respective metallic film or metallic mesh that at least partially lies flat between the end face of the electrode-separator assembly winding and the one of the flat bottom area or the flat top area.

20. The method of claim 19, wherein the insulator completely covers the end face of the electrode-separator assembly.

21. The method of claim 17, further comprising:
providing a first insulator between (i) the end face of the electrode separator assembly winding and (ii) at least part of the second portion of the respective metallic film or mesh that at least partially lies flat between the end face of the electrode-separator assembly winding and the one of the flat bottom area or the flat top area, and
providing a second insulator between (i) the second end face of the electrode-separator assembly winding and (ii) at least part of the second portion of the second respective metallic film or metallic mesh that at least partially lies flat between the second end face of the electrode-separator assembly winding and the another of the flat bottom area or the flat top area.

22. The method of claim 21, wherein the first insulator completely covers the end face of the electrode-separator assembly winding, and
wherein the second insulator completely covers the second end face of the electrode-separator assembly winding.

23. The method of claim 1, wherein the positive electrode, the negative electrode, and the separator collectively form a multi-layer assembly.

24. The method of claim 23, wherein providing the electrode-separator assembly winding includes rolling the multi-layer assembly around a winding mandrel or a winding core.

25. The method of claim 24, further comprising, prior to inserting the cell top into the cell cup, removing the winding mandrel or the winding core from the electrode-separator assembly winding.

26. The method of claim 1, wherein the electrode-separator assembly winding further includes a winding core.

27. The method of claim 1, wherein the positive electrode and the negative electrode are ribbons having thicknesses in the range of 10 μm to 1000 μm.

28. The method of claim 1, wherein the separator layer is a porous plastic film having a thickness in the range of 3 μm to 100 μm.

29. The method of claim 1, wherein the separator layer is a porous plastic film having a thickness in the range of 10 μm to 50 μm.

30. A method for producing a button cell, the method comprising:
providing a cell cup, the cell cup having a flat bottom area, a cell cup casing having a first height, and a bottom edge forming a transition between the flat bottom area and the cell cup casing;
providing a cell top, the cell top having a flat top area, a cell top casing having a second height, and a top edge forming a transition between the flat top area and the cell top casing, wherein at least a portion of the cell top casing is cylindrical;
providing an electrode-separator assembly winding, the electrode-separator assembly winding having:
a positive electrode formed from a first portion of a first metallic film or metallic mesh covered with a first electrode material, and a negative electrode formed from a first portion of a second metallic film or metallic mesh covered with a second electrode material,
wherein:
    the first portion of the first metallic film or metallic mesh covered with the first electrode material and the first portion of the second metallic film or metallic mesh covered with the second electrode material are connected to one another by a separator layer and wound up, along their length, in a spiral shape about an axis, and
    a respective metallic film or metallic mesh includes a second portion, the second portion being a length of the respective metallic film or metallic mesh that is not covered with electrode material and that serves as an output conductor, the respective metallic film or metallic mesh being the first metallic film or metallic mesh or the second metallic film or metallic mesh;

applying an electrically insulating seal at least to an outer portion of the cell top casing;

inserting the electrode-separator assembly winding into the cell top;

inserting the cell top into the cell cup to form a housing, wherein:
    the flat top area is parallel to the flat bottom area,
    the axis of the electrode-separator assembly winding is aligned at right angles to both the flat top area and the flat bottom area,
    the respective metallic film or metallic mesh is bent such that the second portion of the first metallic film or metallic mesh at least partially lies flat between an end face of the electrode-separator assembly winding and one of the flat bottom area or the flat top area, and
    the cell top casing and the cell cup casing form an overlap area extending in a direction parallel to the axis of the electrode-separator assembly winding and having a third height, wherein the first and second heights are related such that the third height is less than second height; and applying, in a radial direction perpendicular to the axis of the electrode-separator assembly winding, a pressure on the cell cup casing so as to seal the housing, wherein the portion of the cell top casing that is cylindrical forms at least a part of the overlap area.

\* \* \* \* \*